United States Patent [19]

Kuhn et al.

[11] Patent Number: 6,013,703

[45] Date of Patent: *Jan. 11, 2000

[54] STABILIZER COMBINATION FOR CHLORINE-CONTAINING POLYMERS

[75] Inventors: Karl Josef Kuhn, Lautertal; Wolfgang Wehner, Ober-Ramstadt; Horst Zinke, Reichelsheim/Odw., all of Germany

[73] Assignee: Witco Vinyl Additives GmbH, Lampertheim, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/822,563

[22] Filed: Mar. 19, 1997

[30] Foreign Application Priority Data

Mar. 22, 1996 [CH] Switzerland ............... 754/96

[51] Int. Cl.[7] ............... C08K 5/34; C08K 5/15; C08K 5/07; C08K 5/05

[52] U.S. Cl. ............... 524/100; 524/56; 524/99; 524/102; 524/109; 524/114; 524/357; 524/386; 524/398; 524/399; 524/403; 524/444; 524/450; 524/567

[58] Field of Search ............... 252/403; 524/99, 524/100, 102, 398, 399, 56, 109, 114, 357, 386, 444, 450, 567

[56] References Cited

U.S. PATENT DOCUMENTS

| | | | |
|---|---|---|---|
| 3,644,246 | 2/1972 | Lozanon | 260/23 |
| 4,000,100 | 12/1976 | Baldyga | 524/147 |
| 5,037,870 | 8/1991 | Gugumus | 524/102 |
| 5,244,949 | 9/1993 | Wirth et al. | 524/102 |
| 5,246,991 | 9/1993 | Igarashi et al. | 524/99 |
| 5,283,273 | 2/1994 | Sander et al. | 524/100 |
| 5,350,785 | 9/1994 | Sander et al. | 524/100 |

FOREIGN PATENT DOCUMENTS

| | | |
|---|---|---|
| 2026899 | 4/1991 | Canada . |
| 2031436 | 6/1991 | Canada . |
| 2037676 | 9/1991 | Canada . |
| 0290388 | 11/1988 | European Pat. Off. . |
| 0468923 | 1/1992 | European Pat. Off. . |
| 0690094 | 6/1995 | European Pat. Off. . |
| 2300192 | 10/1996 | United Kingdom . |

OTHER PUBLICATIONS

Chem. Abst. 117:252524q.

*Primary Examiner*—Kriellion Sanders
*Attorney, Agent, or Firm*—Scully, Scott, Murphy & Presser

[57] ABSTRACT

A stabilizer combination, principally for PVC, is described which essentially comprises A) at least one zinc compound of the formula I $$Zn(R^1R^2) \quad (I)$$

and

B) at least one metal compound of the formula II $$Me^{n+}(R^3_a\ R^4_b\ R^5_c) \quad (II)$$

in which Me is Al, Mg, Na or K, a, b and c are 0, 1, 2 or 3, n=a+b+c and can be from 1 to 3, and at least one radical $R^1$ to $R^5$ independently of one another are $C_1$–$C_{22}$carboxylates, $C_2$–$C_{21}$alkenyl-$CO_2$—, phenyl-$CO_2$—, naphthyl-$CO_2$—, $C_5$–$C_{12}$cycloalkyl-$CO_2$—, $C_7$–$C_{18}$alkylphenyl-$CO_2$—, $C_7$–$C_{18}$alkylphenyl-O—, $C_7$–$C_9$phenylalkyl-$CO_2$—, $C_1$–$C_{21}$-alkyl-O—, $R^8$—O—CO—$[CH_2]_p$—S— or a radical of the formula $R^6$—CO—CH=$CR^7$—$O^\ominus$— and can be Cl— or HO—, where the aforementioned alkyl or alkenyl radical can be branched, interrupted one or more times by oxygen or substituted by one or more OH groups, and the abovementioned phenyl radical can be substituted by one or more methyl, ethyl, propyl, butyl and/or OH groups, $R_6$ and $R_7$ are $C_1$–$C_8$alkyl-, $C_1$–$C_8$alkenyl-, $C_5$–$C_8$cycloalkyl-, benzyl- or phenyl-, p is 1 to 6, $R^8$ is $C_4$–$C_{22}$alkyl that is uninterrupted or interrupted by oxygen, and C) at least one sterically hindered amine comprising the group

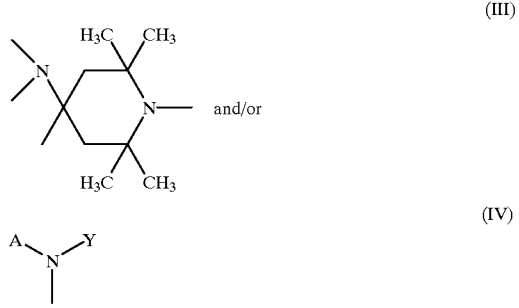

in which A and Y independently of one another are $C_{1-8}$alkyl-, $C_{3-8}$alkenyl-, $C_{5-8}$cycloalkyl-, or $C_{7-9}$phenylalkyl- or together are $C_{2-5}$alkylene that is uninterrupted or interrupted by O, NH or $CH_3$—N.

14 Claims, No Drawings

STABILIZER COMBINATION FOR CHLORINE-CONTAINING POLYMERS

The invention relates to stabilizer combinations comprising at least one organozinc compound of the formula I containing a ZnO or ZnS bond, to metal compounds of the general formula II and to sterically hindered amines which are suitable for stabilizing organic material, especially PVC.

PVC can be stabilized by a range of additives. Compounds of lead, barium and cadmium are particularly suitable for this purpose, but are nowadays controversial on ecological grounds (cf. "Kunststoffadditive", edited by R. G ächter and H. Müller, Carl Hanser Verlag, 3rd ed. 1989, pages 303–311, and "Kunststoff Handbuch PVC", 2nd ed. 1985, volume 2/1, W. Becker/D. Braun, Carl Hanser Verlag 1985, pages 531–538; and Kirk-Othmer: Encyclopedia of Chemical Technology, 4th ed; 1994, vol. 12, "Heat Stabilizers", pp. 1071–1091). The search therefore continues for effective stabilizers and stabilizer combinations which are free from lead, barium and cadmium.

The use of zinc carboxylates and calcium carboxylates as stabilizer components for PVC is known. Calcium compounds, however, can be replaced in whole or in part by compounds of aluminium, magnesium, sodium or potassium, which can be employed advantageously in combination with sterically hindered amines. Consequently, a stabilizer combination has been found comprising A) at least one zinc compound of the formula I $$Zn(R^1R^2) \quad (I)$$

and

B) at least one metal compound of the formula II $$Me^{n+}(R^3{}_a\ R^4{}_b\ R^5{}_c) \quad (II)$$

in which Me is Al, Mg, Na or K, a, b and c are 0, 1, 2 or 3, n=a+b+c and can be from 1 to 3, and at least one radical $R^1$ to $R^5$ independently of one another are $C_1$–$C_{22}$carboxylates, $C_2$–$C_{21}$alkenyl-$CO_2$—, phenyl-$CO_2$—, naphthyl-$CO_2$—, $C_5$–$C_{12}$cycloalkyl-$CO_2$—, $C_7$–$C_{18}$alkylphenyl-$CO_2$—, $C_7$–$C_{18}$alkylphenyl-O—, $C_7$–$C_9$phenylalkyl-$CO_2$—, $C_1$–$C_{21}$alkyl-O—, $R^8$—O—CO—[$CH_2$]$_p$—S— or a radical of the formula $R^6$—CO—CH=CR$^7$—O$^\ominus$— and can be Cl— or HO—, where the abovementioned alkyl or alkenyl radical can be branched, interrupted one or more times by oxygen or substituted by one or more OH groups, and the abovementioned phenyl radical can be substituted by one or more methyl, ethyl, propyl, butyl and/or OH groups, $R^6$ and $R^7$ are $C_1$–$C_8$alkyl-, $C_1$–$C_8$alkenyl-, $C_5$–$C_8$cycloalkyl-, benzyl- or phenyl-, p is 1 to 6, $R^8$ is $C_4$–$C_{22}$alkyl that is uninterrupted or interrupted by oxygen, and C) at least one sterically hindered amine comprising the group

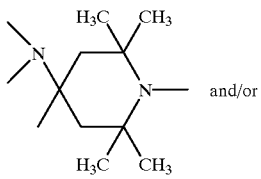

and/or

in which A and Y independently of one another are $C_{1-8}$alkyl-, $C_{3-8}$alkenyl-, $C_{5-8}$cycloalkyl-, or $C_{7-9}$phenylalkyl- or together are $C_{2-5}$alkylene that is uninterrupted or interrupted by O, NH or $CH_3$—N, which can be employed advantageously for stabilizing chlorine-containing polymers, especially PVC. They may also comprise other additives.

Examples of alkylphenyl are methylphenyl, dimethylphenyl, trimethylphenyl, ethylphenyl, isopropylphenyl, t-butylphenyl, di-t-butylphenyl or 2,6-di-t-butyl-4-methylphenyl.

Phenylalkyl is mainly benzyl but also phenylethyl, 3-phenylpropyl, α-methylbenzyl or α,α-dimethylbenzyl.

Cycloalkyl is cyclopentyl, -hexyl, -heptyl, -octyl or -dodecyl.

$C_1$–$C_{22}$alkyl is, for example, methyl, ethyl, propyl, isopropyl, butyl, isobutyl, tert-butyl, pentyl, hexyl, heptyl, octyl, isooctyl, 2-ethylhexyl, nonyl, decyl, undecyl, dodecyl, tridecyl, hexadecyl, octadecyl, eicosyl or heneicosyl.

Alkenyl is, for example, vinyl, allyl, methallyl or hexenyl.

Expediently, A) is a compound of the formula I having a Zn—O bond and B) is a compound of the formula II in which at least one radical $R_1$ to $R_5$ is $C_1$–$C_{22}$carboxylate or acetylacetonate and the other radicals are $C_1$–$C_{22}$carboxylate, acetylacetonate or HO—.

In order to achieve stabilization in the chlorine-containing polymer, the compounds of components A) and B) are expediently each present in amounts of from 0.01 to 10% by weight, preferably from 0.05 to 5% by weight, in particularly from 0.1 to 3% by weight.

Examples of Zn and Me compounds (Components A and B)

A) Zinc compounds

The organozinc compounds with a Zn—O bond comprise zinc enolates, zinc phenolates and/or zinc carboxylates. The latter are compounds from the series of the aliphatic saturated and unsaturated $C_1$–$C_{22}$carboxylates, the aliphatic saturated or unsaturated $C_2$–$C_{22}$carboxylates, which are substituted with at least one OH group or whose chain is interrupted by one or more O atoms (oxa acids), the cyclic and bicyclic carboxylates of 5–22 carbon atoms, the unsubstituted, mono- or poly-OH-substituted and/or $C_{1-16}$ alkyl-substituted phenylcarboxylates, the phenyl-$C_{1-16}$alkylcarboxylates, or the unsubstituted or $C_{1-12}$alkyl-substituted phenolates, or of abietic acid. Examples of Zn—S compounds are Zn mercaptides, Zn mercaptocarboxylates and Zn mercaptocarboxylic esters.

Mention may be made by name, as examples, of the zinc salts of monovalent carboxylic acids, such as formic acid, acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristylic acid, palmitic acid, lauric acid, isostearic acid, stearic acid, 12-hydroxystearic acid, 9,10-dihydroxystearic acid, oleic acid, ricinoleic acid, 3,6-dioxaheptanoic acid, 3,6,9-trioxadecanoic acid, behenic acid, benzoic acid, p-tert-butylbenzoic acid, dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, and sorbic acid, cinnamic acid, mandelic acid, glycolic acid; zinc salts of divalent carboxylic acids and their monoesters, such as oxalic acid, malonic acid, succininic acid, glutaric acid, adipic acid, fumaric acid, pentane-1,5-dicarboxylic acid, hexane-1,6-dicarboxylic acid, heptane-1,7-dicarboxylic acid, octane-1,8-dicarboxylic acid, 3,6,9-trioxadecane-1,10-dicarboxylic acid, lactic acid, malonic acid, maleic acid, tartaric acid, malic acid, salicylic acid, polyglycoldicarboxylic acid (n=10–12), phthalic acid, isophthalic acid, terephthalic acid and hydroxyphthalic acid; and the di- or triesters of tri- or tetravalent carboxylic acids, such as hemimellitic acid, trimellitic acid, pyromellitic acid, citric acid and also so-called overbased zinc carboxylates, or zinc lauryl mercaptide, zinc thioglycolate, zinc thiosalicylate, zinc bis-i-octylthioglycolate, zinc mercaptopropionate, zinc thiolactate, zinc thiomalate, zinc-bis-octylmercaptopropionate, zinc bis-isooctylthiolactate and zinc bis-laurylthiomalate.

The zinc enolates preferably comprise enolates of acetylacetone, of benzoylacetone, and of dibenzoylmethane and enolates of acetoacetic and benzoylacetic esters, and of dehydroacetic acid. It is also possible to employ inorganic zinc compounds such as zinc oxide, zinc hydroxide, zinc carbonate, basic zinc carbonate or zinc sulfide.

Preference is given to neutral or basic zinc carboxylates of a carboxylic acid having 1 to 22 carbon atoms (zinc soaps), for example benzoates or alkanoates, preferably $C_8$alkanoates, stearate, oleate, laurate, palmitate, behenate, Versatate, hydroxystearates and -oleates, dihydroxystearates, p-tert-butylbenzoate, or (iso)octanoate. Particular preference is given to stearate, oleate, Versatate, benzoate, p-tert-butylbenzoate and 2-ethylhexanoate.

B) Metal compounds

In addition to the abovementioned zinc compounds the novel stabilizer combination also comprises organoaluminium, -magnesium, -potassium or -sodium compounds in which the anionic radicals correspond to the groups listed in the case of the zinc compounds. Preferred compounds of this type include aluminium carboxylates or magnesium carboxylates, for example basic aluminium monostearate, basic aluminium distearate, aluminium tristearate, aluminium octoate, aluminium 2-ethylhexanoate, aluminium laurate, basic aluminium acetates and also aluminium enolates or magnesium enolates, for example aluminium acetylacetonate, magnesium acetylacetonate and aluminium alcoholates or magnesium alcoholates.

Examples of inorganic compounds are aluminium hydroxide, aluminium phosphates, basic aluminium chlorides (polyaluminium chlorides), magnesium oxide, magnesium hydroxide and magnesium carbonate.

The sodium and potassium compounds preferably comprise carboxylates and enolates. The described metal soaps and their mixtures can be employed in amounts of, for example, from 0.001 to 10 parts by weight, expediently from 0.01 to 5 parts by weight, preferably from 0.01 to 3 parts by weight, based on 100 parts by weight of chlorine-containing polymer. They may also be present in the form of mixed salts (coprecipitates).

Examples of sterically hindered amines (component C)

The sterically hindered amine generally comprises a compound comprising the group

(IV)

in which A and Y independently of one another are $C_{1-8}$alkyl-, $C_{3-8}$alkenyl-, $C_{5-8}$cycloalkyl-, or $C_{7-9}$phenylalkyl-, or together form $C_2$–$C_5$alkylene that is uninterrupted or interrupted by O, NH or $CH_3$—N, or comprise a cyclic, sterically hindered amine, in particular a compound from the series of the alkyl- or polyalkylpiperidines, especially the tetramethylpiperidines comprising the group

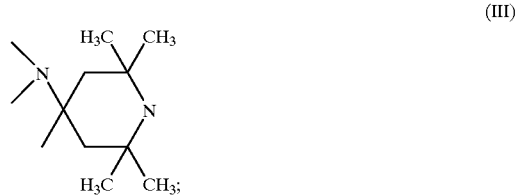

(III)

examples of such polyalkylpiperidine compounds are the following (n in oligomeric or polymeric compounds ranges from 2–200, preferably from 2–10, especially from 3–7):

01) N,N'-bis(2,2,6,6-tetramethylpiperidin-4-yl)ethylene-1,2-diacetamide

01a) N,N'-bis-(2,2,6,6-tetramethylpiperidin-4-yl) hexamethylene-1,6-di-acetamide 01b) N,N'-bis-(2,2,6,6-tetramethylpiperidin-4-yl) ethylene-1,2-di-formamide 02) N,N'-bis(2,2,6,6-tetramethylpiperidin-4-yl)adipamide 03) N,N'-bis(2,2,6,6-tetramethylpiperidin-4-yl)oxamide 04) 4-Hydroxybenzamido-2,2,6,6-tetramethylpiperidine 05) 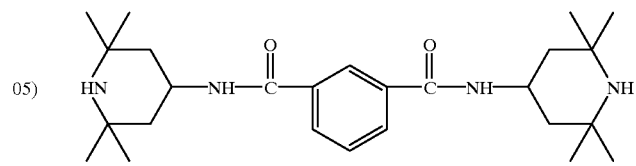

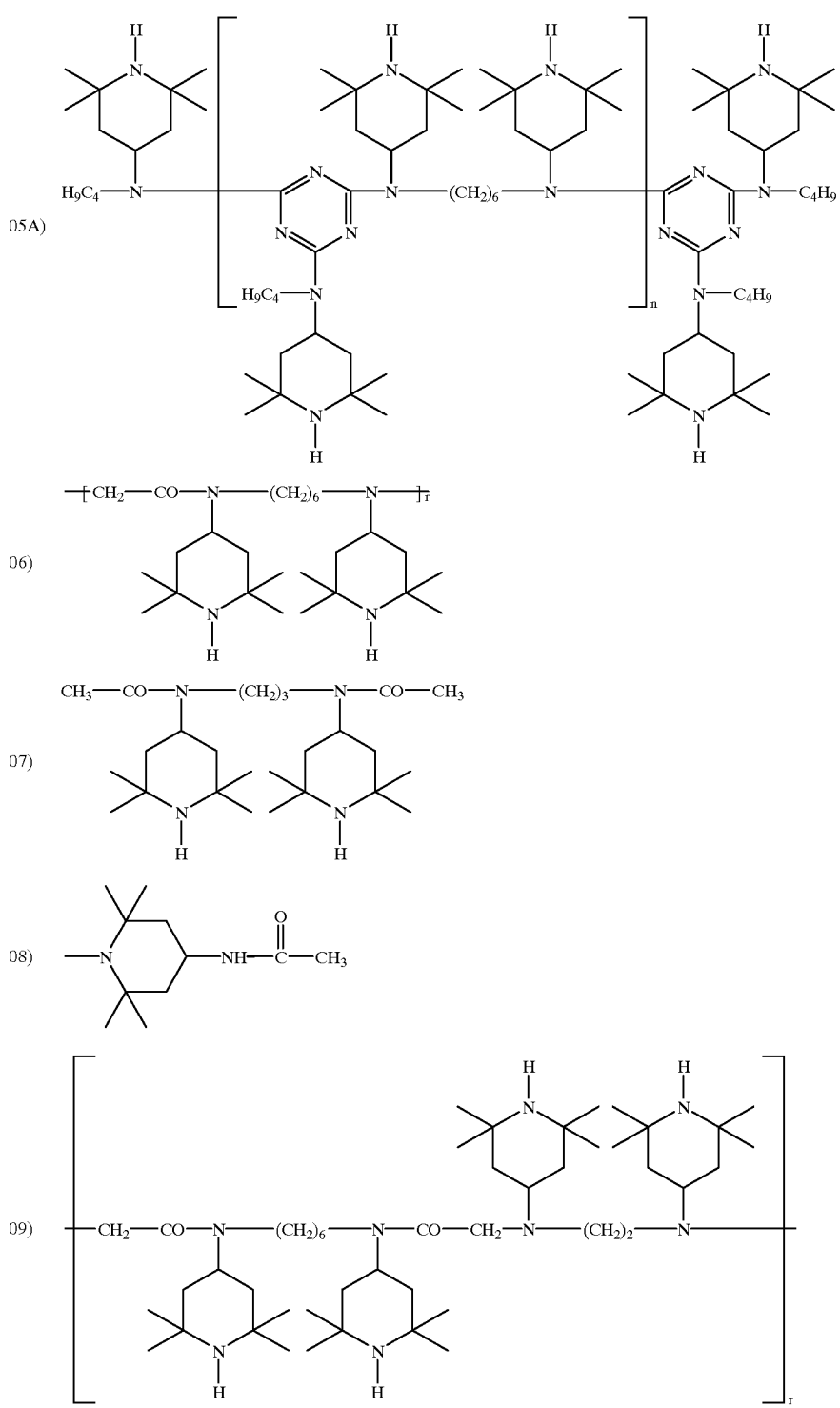

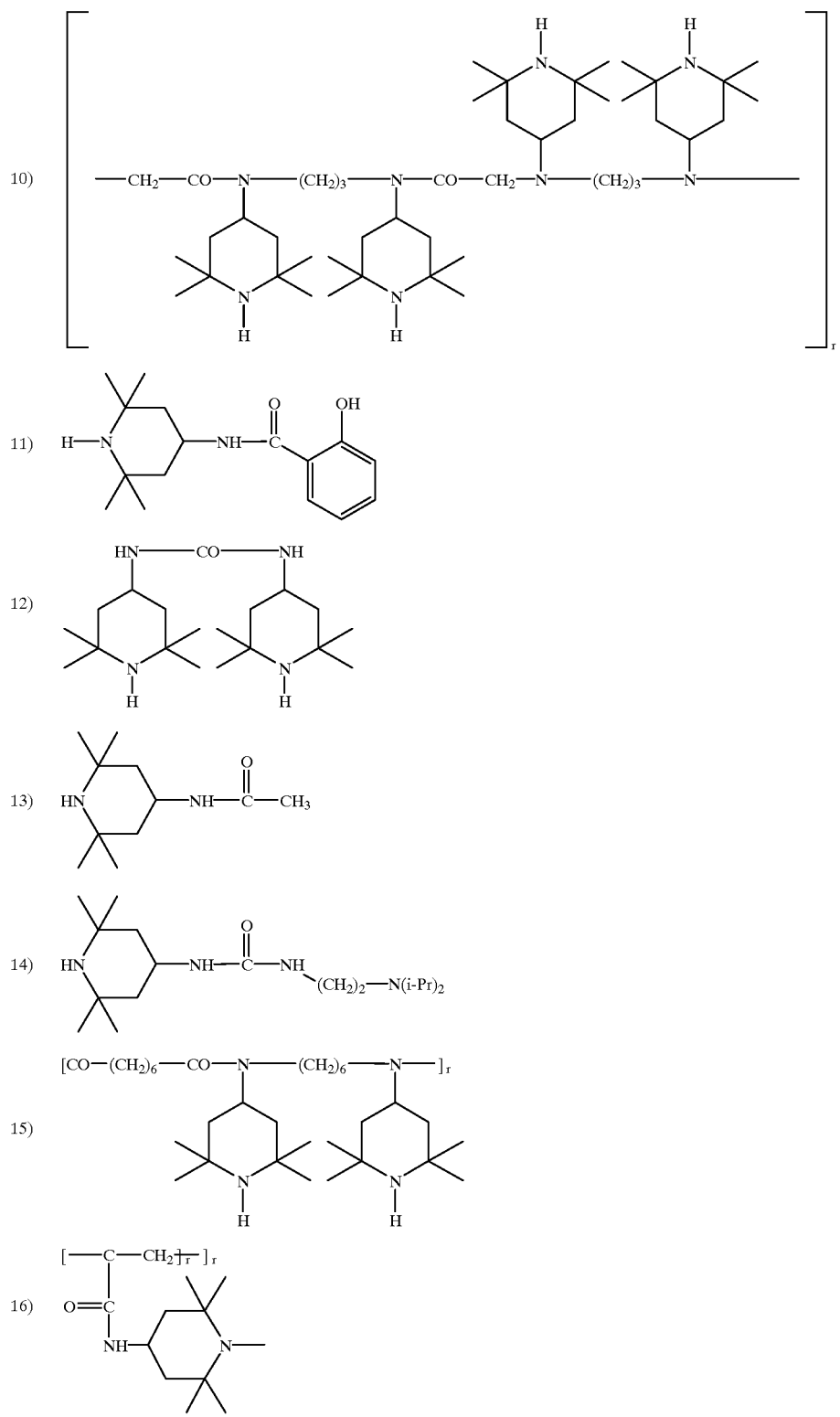

17) 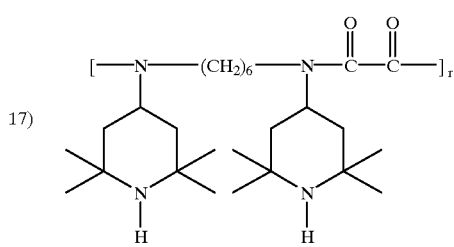
18) 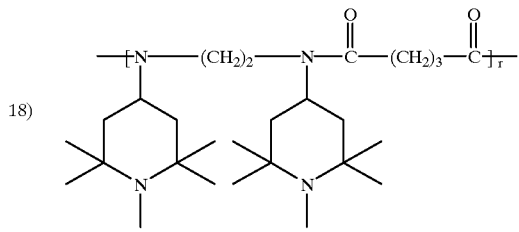
19) 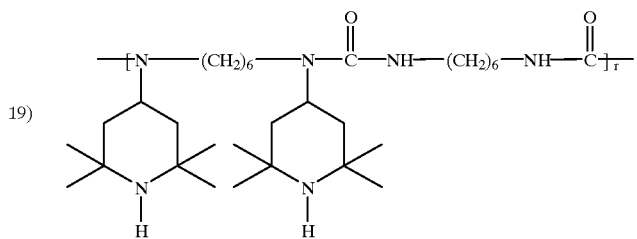
20) 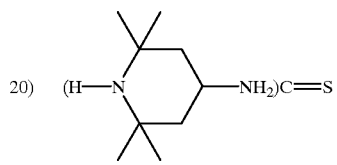
21) 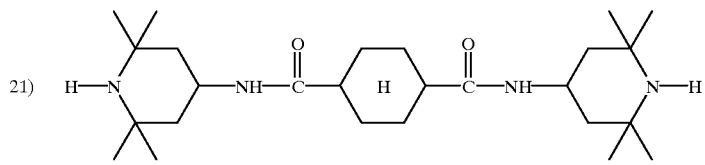
22) 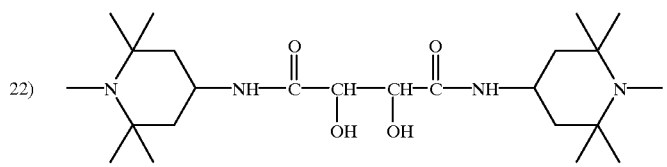
23) 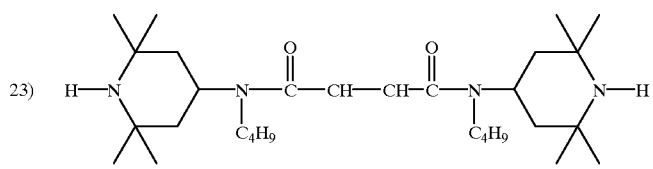
24) 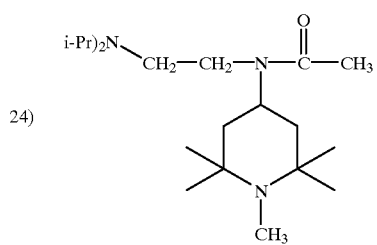

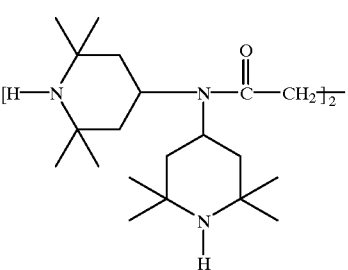

-continued
33) 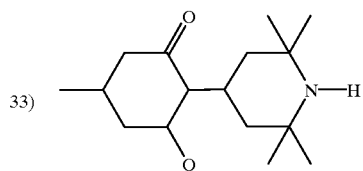
34) 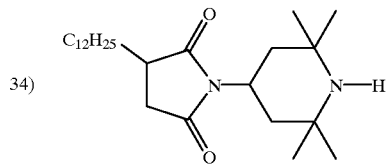
35) 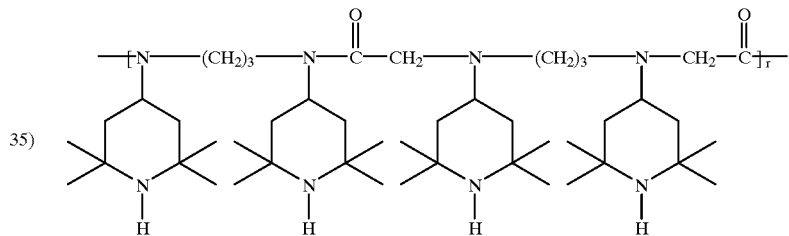
36) 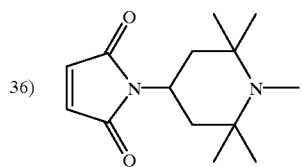
37) 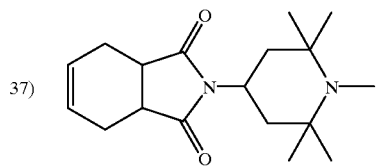
38) 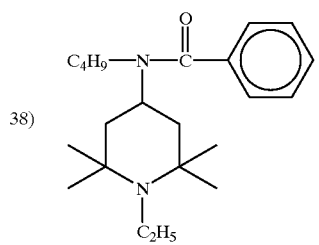
39) 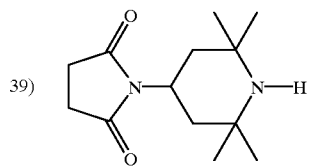
40) 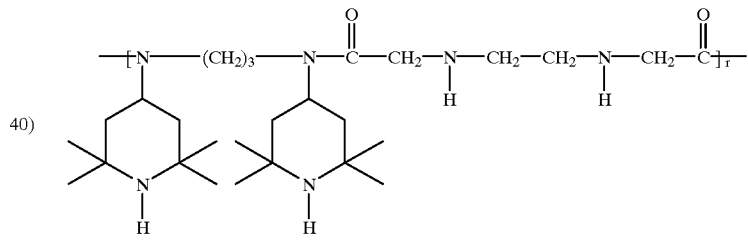

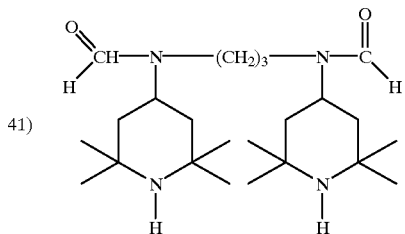

41)

Also suitable are compounds having the following structure:

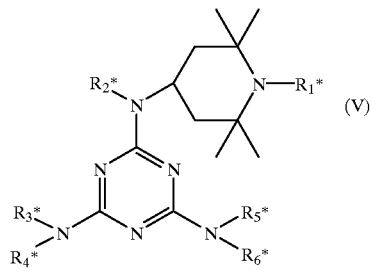

| No. | $R_2^*-N-R_1^*$ (on TMP ring) | $R_3^*,R_4^*-N$ | $R_5^*,R_6^*-N$ |
|---|---|---|---|
| 42 | PMP—NH— | $H_2N$— | $H_2N$— |
| 43 | TMP—NH— | TMP—NH— | $H_2N$— |
| 44 | TMP—NH— | $Me_2N$— | $Me_2N$— |
| 45 | TMP—NH— | TMP—NH— | TMP—NBu— |
| 46 | TMP—NH— | TMP—NH— | (HO—$CH_2CH_2$—$)_2N$— |
| 47 | TMP—NH— | HO—$CH_2CH_2$—NH— | TMP—NBu— |
| 48 | $(TMP)_2N$— | $H_2N$— | $H_2N$— |
| 49 | TMP—NH— | (C₆H₁₁)₂N— | (C₆H₁₁)₂N— |
| 50 | $(TMP)_2N$— | $(TMP)_2N$— | $(TMP)_2N$— |
| 51 | PMP—NH— | PMP—NH— | PMP—NH— |
| 52 | (i-Pr)$_2$N—$C_2H_4$—N(TMP)— | $Pr_2N$— | $Pr_2N$— |
| 53 | (i-Pr)$_2$N—$C_2H_4$—N(TMP)— | TMP—NH | TMP—NH |
| 54 | TMP—NH | $Et_2N$— | TMP—NH— |
| 55 | TMP—NH | $(HOCH_2)_3C$—NH— | TMP—NH— |
| 56 | TMP—NH— | morpholinyl-N— | $Et_2N$—$C_2H_4$—NH— |
| 57 | $TMP_2N$— | TMP—NH— | $Et_2N$—$C_2H_4$—NH— |
| 58 | TMP—NH— | TMP—NH | PhCH$_2$NH— |

-continued
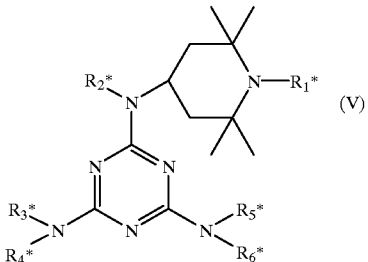
| No. | R₂*\N-...-N-R₁* (TMP group) | R₃*\N-R₄* | R₅*\N-R₆* |
|---|---|---|---|
| 59 | TMP—NH— | 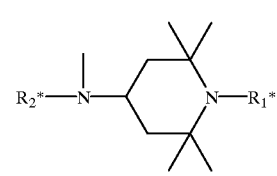 | TMP—NH— |
| 60 | TMP—NH— | 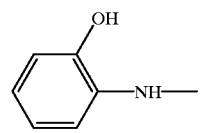 | 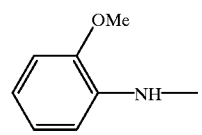 |
| 61 | TMP—NH— | Et₂N—C₂H₄—NH— | 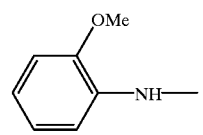 |
| 62 | TMP—N(n-Bu)— | Et₂N— | Et₂N— |
| 63 | TMP—N(Et)— | (n-Bu)₂N— | TMP—N(Et)— |
| 64 | TMP—NH— | 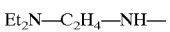 | TMP—NH— |
| 65 | TMP—NH— | 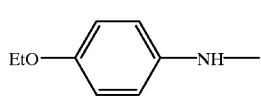 | TMP—NH— |
| 66 |  |  |  |

-continued
| No. | 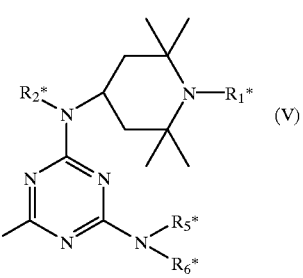 (V)  <br> 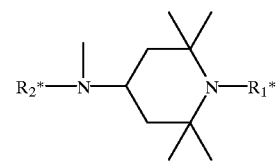 | $\begin{array}{c}R_3^*\\R_4^*\end{array}$N— | $\begin{array}{c}R_5^*\\R_6^*\end{array}$N— |
|---|---|---|---|
| 67 |  | 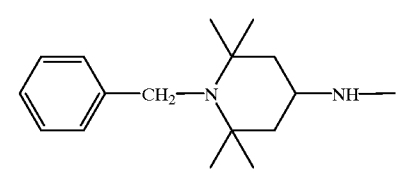 |  |
| 68 | 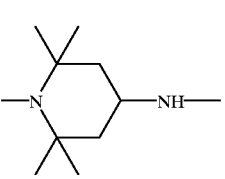 | TMP—NH— | TMP—NH— |
| 69 | TMP—NH— | (HO—C$_2$H$_4$)$_2$N— | (HO—C$_2$H$_4$)$_2$N— |
| 70 | Et$_2$N—(CH$_2$)$_3$—N(—TMP)— | TMP—NH— | TMP—NH— |
| 71 | i-C$_3$H$_7$—N(—TMP)— | PMP—NH— | PMP—NH— |
| 72 | HO—CH$_2$CH$_2$—N(—TMP)— | 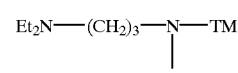 | 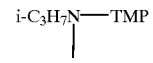 |
| 73 | 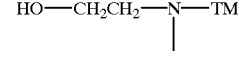 | H$_2$N— | H$_2$N— |
| 74 |  | TMP—NH— | TMP—NH— |

6,013,703
-continued
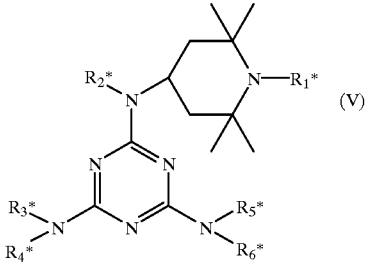
(V)
| No. | 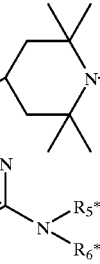 | $\begin{matrix}R_3^* \\ R_4^*\end{matrix}\!N\!-$ | $\begin{matrix}R_5^* \\ R_6^*\end{matrix}\!N\!-$ |
|---|---|---|---|
| 75 | 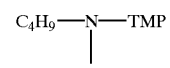 | 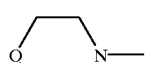 | 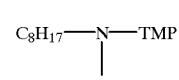 |
| 76 | C₈H₁₇—N—TMP | TMP—NH— | TMP—NH— |
| 77 | 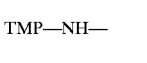 | 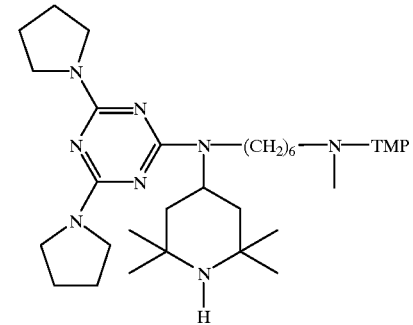 | 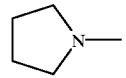 |
| 78 | HO—C₃H₆—N—PMP | TMP—NH— | TMP—NH— |
| 79 | (i-Prop)₂N—C₂H₄—N—TMP | (i-Pr)₂N—C₂H₄—NH— | (i-Pr)₂N—C₂H₄—NH— |
| 80 | 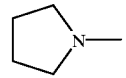 | Et₂N— | Et₂N— |

-continued

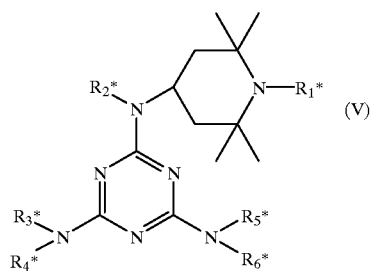

| No. | 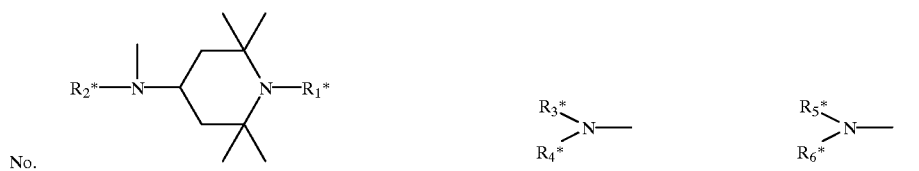 | $R_3^*$<br>$R_4^*$N— | $R_5^*$<br>$R_6^*$N— |
|---|---|---|---|
| 81 | Bu₂N— (triazine structure with (CH₂)₃—N(Me)—TMP and Bu₂N, plus 2,2,6,6-tetramethylpiperidinyl-NH group) | Bu₂N— | Bu₂N— |
| 82 | TMP—NH— (triazine with (CH₂)₆—N(TMP)—N(Me)—TMP and TMP—NH—) | TMP—NH— | TMP—NH— |
| 83 | PMP—NH— (triazine with (CH₂)₃—N(TMP)—N(Me)—TMP and C₂H₄—NH—NEt₂) | PMP—NH— | Et₂N—C₂H₄—NH— |
| 84 | (TMP₂)N— | (i-Pr)₂N—C₂H₄—NH— | (i-Pr)₂N—C₂H₄—NH— |
| 85 | TMPNH— | Et₂N—C₃H₆—NH— | Et₂N—C₃H₆—NH— |
| 86 | TMP—NH— (triazine with Bu, TMP—NH—Bu, and (CH₂)₆—N(TMP)—N(Me)—TMP) | TMP—N(Bu)— | TMP—N(Bu)— |

Key:

-continued
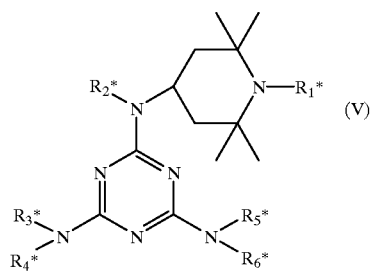
| No. | 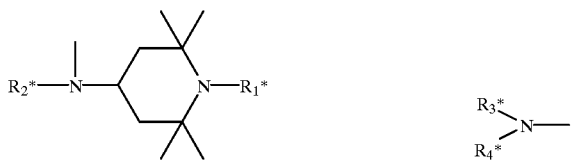 | | |
|---|---|---|---|
| TMP = | 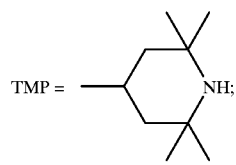 | | |
| PMP = | 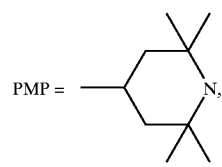 | | |
Me = methyl;
Et = ethyl;
Pr = propyl;
Bu = butyl.
Further suitable compounds are:
87) 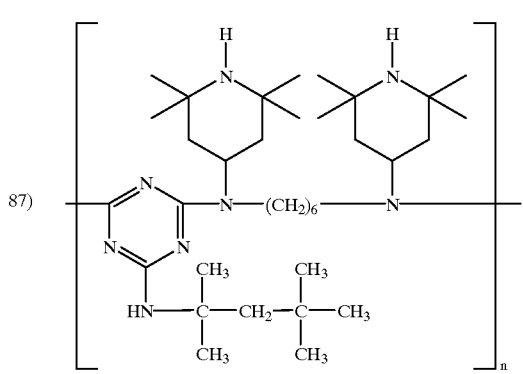
88) 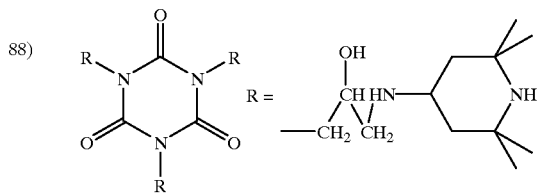
89) (R)(CH$_3$)N(CH$_2$)$_3$N(R)(CH$_2$)$_2$N(R)(CH$_2$)$_3$N(CH$_3$)(R)
(R) = 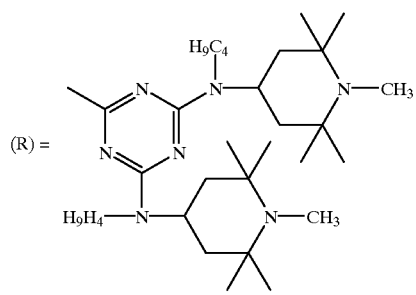
90) (R)(CH$_3$)N(CH$_2$)$_3$N(R)(CH$_2$)$_2$N(R)(CH$_2$)$_3$N(CH$_3$)(R)
(R) = 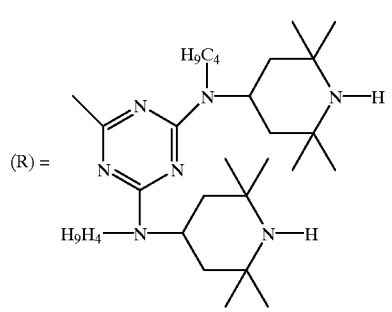

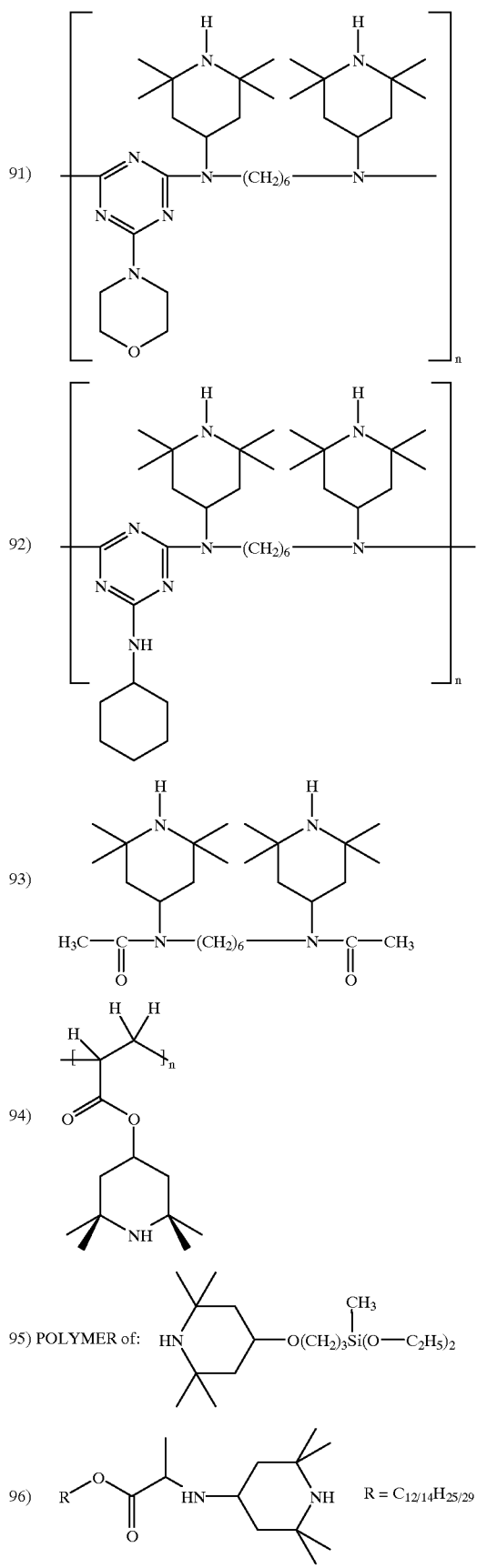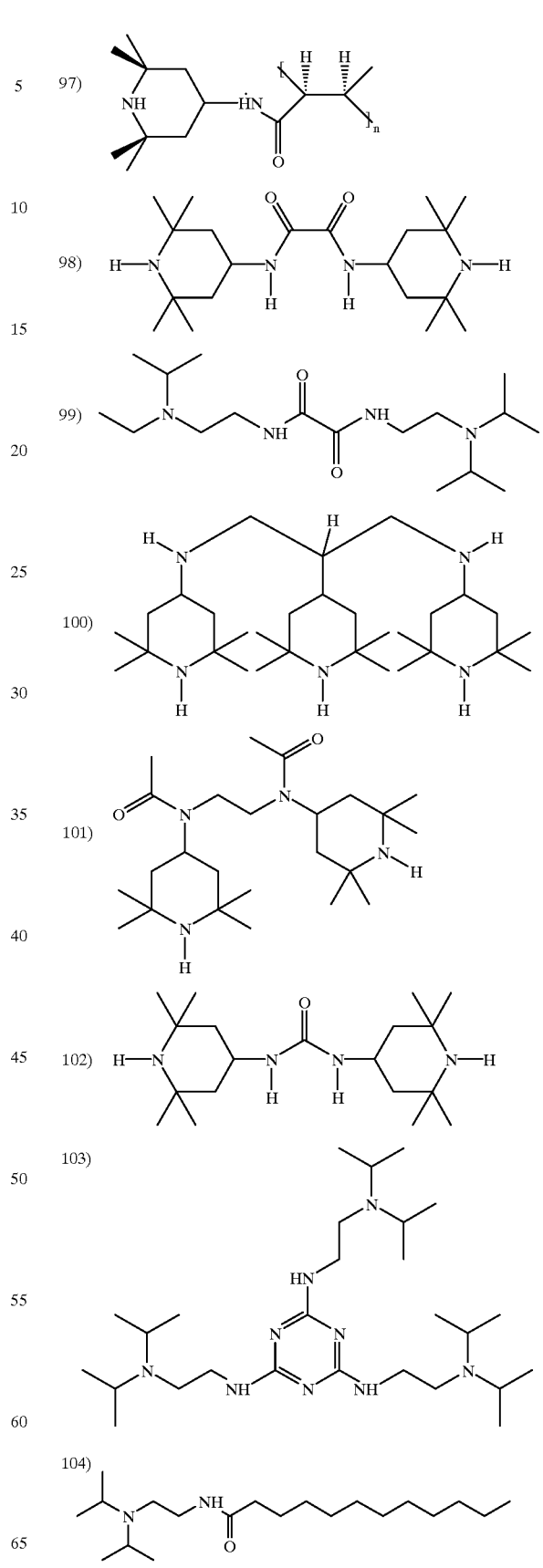

105) 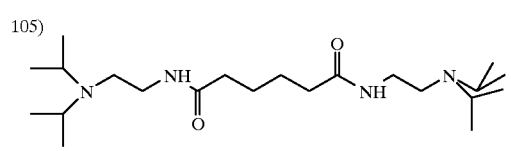
106) 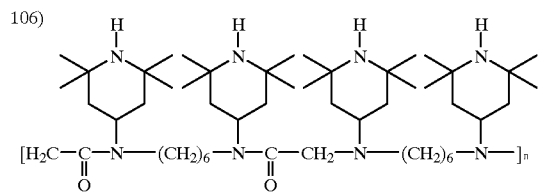
107) 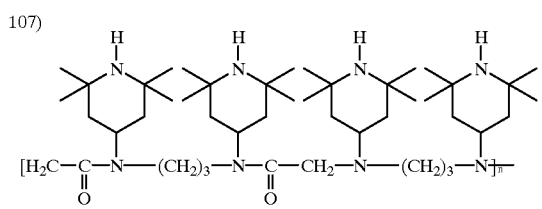
108) 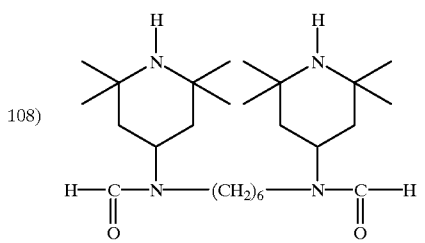
109) 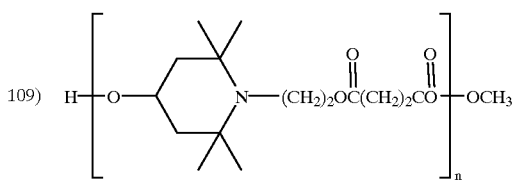
110) 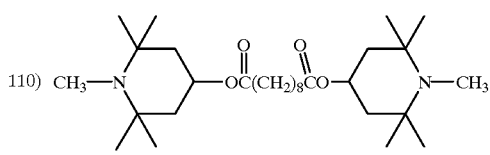
111) 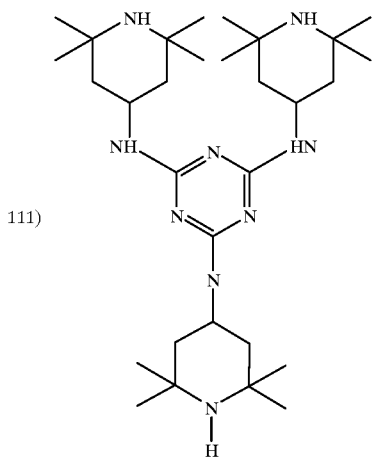
112) 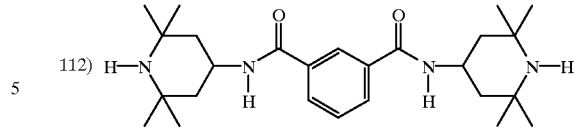
113) 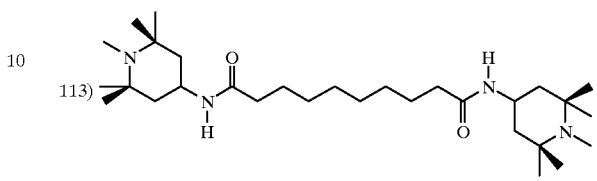
114) 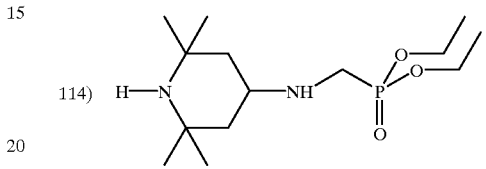
115) 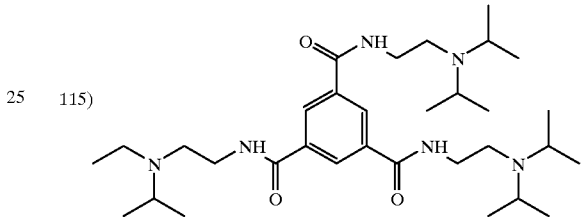
116) 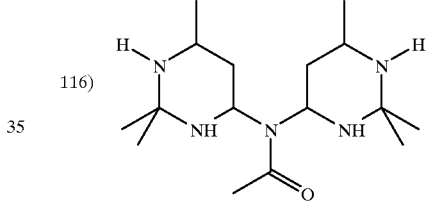
117) 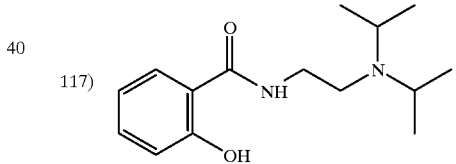
118) 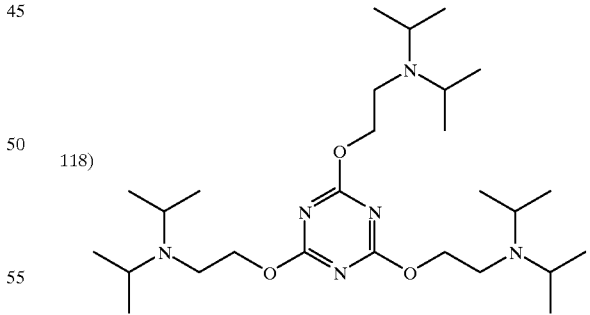
119) 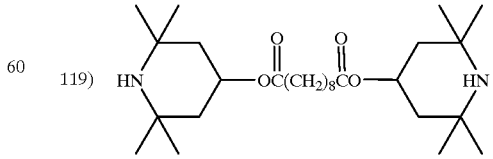

Further examples are:
120) 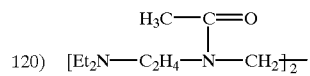
121) [$^{iso}$Pr$_2$N—CH$_2$CH$_2$NH—CO—CH$_2$CH$_2$]$_2$
122) [$^{iso}$Pr$_2$N—CH$_2$CH$_2$CH$_2$—NH—CO]$_2$
123) Me$_2$N—CH$_2$CH$_2$—NH—
124) 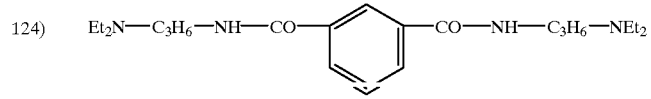
125) 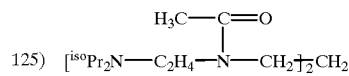
126) 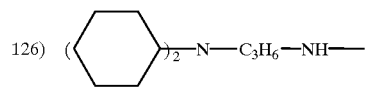
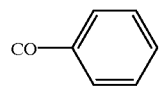
127) 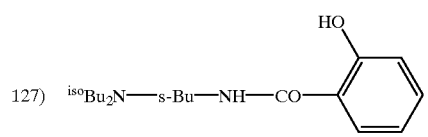
128) ($^{tert}$Bu$_2$N—C$_3$H$_6$—NH)$_2$CO
129) 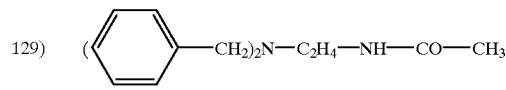
130) (Et$_2$N—C$_2$H$_4$—NH—CO)$_2$
131) 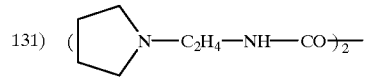
132) 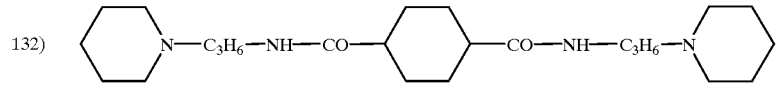
133) [$^{iso}$Pr$_2$N—C$_2$H$_4$—NH—CO—CH(OH)]$_2$
134) (Et$_2$N—C$_3$H$_6$—N(CH$_3$)—CO—CH$_2$)$_2$
135) [$^{iso}$Pr$_2$N—C$_3$H$_6$—N—CO—CH$_3$]
136) 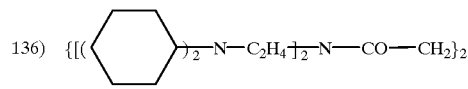
137) 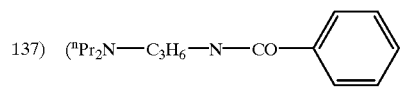
138) 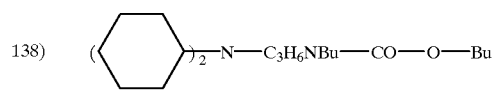
139) 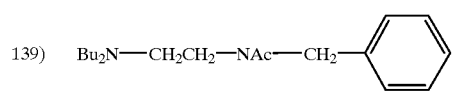

-continued

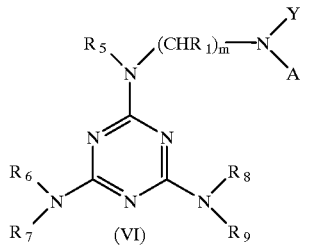

and compounds of the structure VI

Examples of compounds of the formula VI are:

| | AYN—(CHR$_1$)$_m$—NR$_5$— | R$_6$R$_7$N— | R$_8$R$_9$N— |
|---|---|---|---|
| 140) | Et$_2$N—C$_2$H$_4$—NH— | —NH$_2$ | —NH$_2$ |
| 141) | Et$_2$N—C$_2$H$_4$—NH— | Et$_2$N—C$_2$H$_4$—NH— | Et$_2$N—C$_2$H$_4$—NH— |
| 142) | $^n$Pr$_2$N—C$_3$H$_6$—NH— | HO—C$_2$H$_4$—NH— | HO—C$_2$H$_4$—NH— |
| 143) | $^{iso}$Pr$_2$N—C$_2$H$_4$—NH— | (HO—C$_2$H$_4$—)$_2$N— | (HO—C$_2$H$_4$—)$_2$N— |
| 144) | (C$_6$H$_{11}$)$_2$N—C$_2$H$_4$—NH— | Et—NH— | (C$_6$H$_{11}$)$_2$N—C$_2$H$_4$—NH— |
| 145) | piperidinyl-C$_3$H$_6$—NH— | piperidinyl-C$_3$H$_6$—NH— | Me—N(piperazinyl)— |
| 146) | pyrrolidinyl-C$_2$H$_4$—NH— | pyrrolidinyl— | pyrrolidinyl— |
| 147) | morpholinyl-C$_3$H$_6$—NH— | morpholinyl-C$_3$H$_6$—NH— | morpholinyl— |
| 148) | $^{iso}$Pr$_2$N—C$_2$H$_4$—NH— | $^{iso}$Pr$_2$N—C$_2$H$_4$—NH— | $^{iso}$Pr$_2$N— |
| 149) | $^{iso}$Pr$_2$N—C$_2$H$_4$—NH— | $^{iso}$Pr$_2$N—C$_2$H$_4$—NH— | $^{iso}$PrNEt— |
| 150) | Et$_2$N—C$_2$H$_4$—NH— | Et$_2$N—C$_2$H$_4$—NH— | (C$_6$H$_{11}$)$_2$N— | where: Me=methyl, Et=ethyl, Bu=butyl, $^{tert}$Bu=tertiary-butyl, $^{iso}$Pr=isopropyl, $^n$Pr=normal-propyl, Ac=acetyl.

For stabilization purposes, the compounds of component C) are employed in the chlorine-containing polymer expediently in a proportion of from 0.01 to 10 parts, preferably from 0.05 to 5 parts, in particular from 0.1 to 3 parts, per 100 parts of polymer.

In place of an individual sterically hindered amine it is also possible in the context of the present invention to use a mixture of different sterically hindered amines.

The abovementioned amines are known compounds; many of them are obtainable commercially.

The compounds can be present in the polymer in proportions of from 0.005 to 5%, preferably from 0.01 to 2% and, in particular, from 0.01 to 1%.

Further stabilizers

The novel stabilizer combination can be used together with further additives which are customary for the processing and stabilization of chlorine-containing polymers, examples being 1. Stabilizers Epoxides and epoxidized fatty acid esters; phosphites; thiophosphites and thiophosphates; polyols; 1,3-dicarbonyl compounds; mercaptocarboxylic esters; dihydropyridines; antioxidants; light stabilizers and UV absorbers; alkali metal and alkaline earth metal compounds; perchlorate salts; zeolites; hydrotalcites; dawsonites;

2. Further common PVC additives, for example lubricants; plasticizers; impact modifiers; processing aids; blowing agents; fillers; antistats; biocides; antifogging agents; pigments and dyes; metal deactivators; flameproofing agents (cf. in this respect "Handbook of PVC Formulating", E. J. Wickson, John Wiley & Sons, New York 1993).

Examples of such additives are known to the skilled worker and can be found in the technical literature. Without limitation, mention may be made here of some of the known additives and processing aids:

Phosphites: Organic phosphites are known co-stabilizers for chlorine-containing polymers. Examples are trioctyl, tridecyl, tridodecyl, tritridecyl, tripentadecyl, trioleyl, tristearyl, triphenyl, tricresyl, trisnonylphenyl, tris-2,4-t-butylphenyl or tricyclohexyl phosphite. Further suitable phosphites are variously mixed aryl dialkyl and alky diarylphosphites, such as phenyl dioctyl, phenyl didecyl, phenyl didodecyl, phenyl ditridecyl, phenyiditetradecyl, phenyl dipentadecyl, octyl diphenyl, decyl diphenyl, undecyl diphenyl, dodecyldiphenyl, tridecyl diphenyl, tetradecyl diphenyl, pentadecyl diphenyl, oleyl diphenyl, stearyl diphenyl and dodecyl bis-2,4-di-t-butylphenyl phosphite.

Furthermore, phosphites of various diols and polyols can also be used advantageously; examples are tetraphenyldipropylene glycol diphosphite, polydipropylene glycol phenyl phosphite, tetramethylolcyclohexanol decyl diphosphite, tetramethylolcyclohexanol butoxyethoxyethyl diphosphite, tetramethylolcyclohexanol nonylphenyl diphosphite, bisnonylphenyl ditrimethylolpropane diphosphite, bis-2-butoxyethyl di-trimethylolpropane diphosphite, trishydroxyethyl isocyanurate hexadecyl triphosphite, didecylpentaerythritol diphosphite, distearyl pentaerythritol diphosphite, bis-2,4-di-t-butylphenyl pentaerythritol diphosphite, and also mixtures of these phosphites and aryl/alkyl phosphite mixtures of the statistical composition $(H_{19}C_9—C_6H_4)O_{1.5}P(OC_{12,13}H_{25,27})_{1.5}$ or $[C_8H_{17}—C_6H_4—O—]_2P[i—C_8H_{17}O]$ or $(H_{19}C_9—C_6H_4)O_{1.5}P(OC_{9,11}H_{19,23})_{1.5}$ The organic prosphites can be employed in an amount of, for example, from 0.01 to 10 parts by weight, expediently from 0.05 to 5 parts by weight and, in particular, from 0.1 to 3 parts by weight, based on 100 parts by weight of PVC.

Polyols: Examples of suitable compounds of this type are: pentaerythritol, dipentaerythritol, tripentaerythritol, bistrimethylolpropane, trimethylolethane, bistrimethylolethane, trimethylolpropane, sorbitol, maltitol, isomaltitol, lactitol, lycasine, mannitol, lactose, leucrose, tris(hydroxyethyl) isocyanurate, palatinite, tetramethylolcyclohexanol (TMCH), tetramethylolcyclopentanol, tetramethylolcyclopyranol, glycerol, diglycerol, plyglycerol, thiodiglycerol, or 1-O-α-D-glycopyranosyl-D-mannitol dihydrate, and also polyvinyl alcohol and cyclodextrins. Among these, TMCH and the disaccharide alcohols are preferred.

The polyols can be employed in an amount of, for example, from 0.01 to 20 parts by weight, expediently from 0.1 to 20 parts by weight, and, in particular, from 0.1 to 10 parts by weight, based on 100 parts by weight of PVC.

1,3-Dicarbonyl compounds: Examples of 1,3-dicarbonyl compounds are acetylacetone, butanoylacetone, heptanoylacetone, stearoylacetone, palmitoylacetone, lauroylacetone, 7-tert-nonylthioheptane-2,4-dione, benzoylacetone, dibenzoylmethane, lauroylbenzoylmethane, palmitoylbenzoylmethane, stearoylbenzoylmethane, isooctylbenzoylmethane, 5-hydroxycapronylbenzoylmethane, tribenzoylmethane, bis(4-methylbenzoyl)methane, benzoyl-p-chlorobenzoylmethane, bis(2-hydroxybenzoyl)methane, 4-methoxybenzoylbenzoylmethane, bis(4-methoxybenzoyl) methane, 1-benzoyl-1-acetylnonane, benzoylacetylphenylmethane, stearoyl-4-methoxybenzoylmethane, bis(4-tert-butylbenzoyl)methane, benzoylformylmethane, benzoylphenylacetylmethane, bis (cyclohexanoyl)methane, di(pivaloyl)methane, acetoacetic methyl, ethyl, hexyl, octyl, dodecyl or octadecyl ester, benzoylacetic ethyl, butyl, 2-ethylhexyl, dodecyl or octadecyl ester, stearoylacetic ethyl, propyl, butyl, hexyl or octyl ester and dehydroacetic acid, and the zinc, alkali metal, alkaline earth metal or aluminium salts thereof.

The 1,3-dicarbonyl compounds can be employed in an amount of, for example, from 0.01 to 10 parts by weight, expediently from 0.01 to 3 parts by weight and, in particular, from 0.01 to 2 parts by weight, based on 100 parts by weight of PVC.

Thiophosphites and thiophosphates: Thiophosphites and thiophosphates are compounds of the general type $(RS)_3P$, $(RS)_3P=O$ and $(RS)_3P=S$, as described in the patent documents DE 2809492, EP 090770 and EP 573394. Examples are: trithiohexyl phosphite, trithiooctyl phosphite, trithiolauryl phosphite, trithiobenzyl phosphite, tris [carboxy-i-octyloxy]methyl trithiophosphate, S,S,S-tris [carbo-i-octyloxy]methyl trithiophosphate, S,S,S-tris[carbo-2-ethylhexyloxy]methyl trithiophosphate, S,S,S,-tris-1-[carbohexyloxy]ethyl trithiophosphate, S,S,S-tris-1-[carbo-2-ethylhexyloxy]ethyl trithiophosphate, S,S,S-tris-2-[carbo-2-ethylhexyloxy]ethy trithiophosphate.

The thiophosphites and thiophosphates can be present in the chlorine-containing polymer expediently in proportions of from 0.01 to 20%, preferably from 0.1 to 5% and, in particular, from 0.1 to 1%.

Mercaptocarboxylic esters: Examples of these compounds are esters of thioglycolic acid, thiomalic acid, mercaptopropionic acid, of mercaptobenzoic acids and of thiolactic acid, as are described in FR 2459816, EP 90748, FR 2552440 and EP 365483. The mercaptocarboxylic esters also embrace corresponding polyol esters and their partial esters.

They can be present in the chlorine-containing polymer expediently in proportions of from 0.01 to 10%, preferably from 0.1 to 5% and, in particular, from 0.1 to 1%.

Epoxides and epoxidized fatty acid esters: The novel stabilizer combination may additionally comprise at least one epoxidized fatty acid ester. Particularly suitable for this are esters of fatty acids from natural sources, such as soya oil or rapeseed oil.

The epoxy compounds are employed in amounts of, for example, upwards of 0.1 part per 100 parts by weight of composition, expediently from 0.1 to 30 parts, preferably from 0.5 up to 25 parts by weight. Further examples are epoxidized polybutadiene, epoxidized linseed oil, epoxidized fish oil, epoxidized tallow, methylbutyl or 2-ethylhexyl epoxystearate, tris-(epoxypropyl)isocyanurate, epoxidized castor oil, epoxidized sunflower oil, 3-phenoxy-1,2-epoxypropane, bisphenol A diglycidyl ether, vinylcyclohexene diepoxide, dicyclopentadiene diepoxide and 3,4-epoxycyclohexylmethyl 3,4-epoxycyclohexanecarboxylate. Also suitable as epoxides are derivatives of bisphenol A and of bisphenol F, as described, for example, in South African patent document ZA-2600/94.

Dihydropyridines and polydihydropyridines: Suitable monomeric dihydropyridines are compounds as described, for example, in FR 2039496, EP 2007, EP 362012 and EP 24754. Preference is given to those of the formula

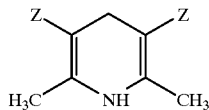

in which Z is $CO_2CH_3$, $CO_2C_2H_5$, $CO_2{}^nC_{12}H_{25}$ or $—CO_2C_2H_4—S—{}^nC_{12}H_{25}$.

Particularly suitable polydihydropyridines are compounds of the following formula

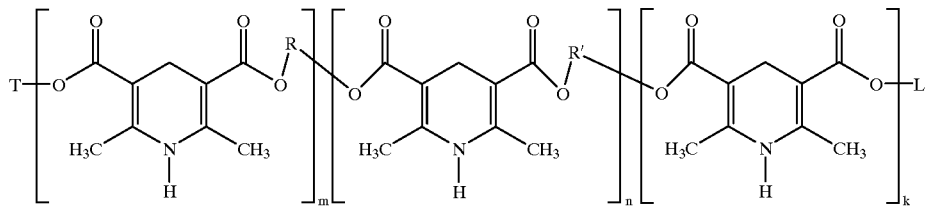

in which T is unsubstituted $C_{1-12}$alkyl,

L is as defined for T, m and n are numbers from 0 to 20, k is 0 or 1,

R and R' independently of one another are ethylene, propylene, butylene or an alkylene- or cycloalkylenebismethylene group of the type —(—$C_pH_{2p}$—X—)$_t$$C_pH_{2p}$—, p is from 2 to 8, t is from 0 to 10, and X is oxygen or sulfur.

Compounds of this kind are described in more detail in EP 0286887. The (poly)dihydropyridines can be employed in the chlorine-containing polymer expediently in proportions of from 0.001 to 5 parts by weight and, in particular, from 0.005 to 1 part by weight, based on the polymer.

Particular preference is given to thiodiethylenebis[5-methoxycarbonyl-2,6-dimethyl-1,4-dihydropyridine-3-carboxylate].

Alkali metal and alkaline earth metal compounds: By these terms are meant principally the carboxylates of the above-described acids, or also corresponding oxides and hydroxides, carbonates or basic carbonates. Also suitable are mixtures thereof with organic acids. Examples are NaOH, KOH, CaO, Ca(OH$_2$), MgO, Mg(OH)$_2$, CaCO$_3$, MgCO$_3$, dolomite, huntite, and also Na, K, Ca or Mg salts of fatty acids.

In the case of carboxylates of alkaline earth metals and of Zn, it is also possible to employ adducts thereof with MO or M(OH)$_2$ (M=Ca, Mg, Sr or Zn), so-called overbased compounds.

Preference is given to the use, in addition to the novel stabilizer combination, of alkali metal, alkaline earth metal and/or aluminum carboxylates, for example Na, K, Ca or aluminium stearates.

Perchlorate salts: Examples are those of the formula M(ClO$_4$)$_n$ where M is Li, Na, K, Mg, Ca, Ba, Zn, Al, Ce or La. The index n is, in accordance with the valency of M, 1, 2 or 3. The perchlorate salts can be present as complexes with alcohols or ether alcohols. In this context, the respective perchlorate can be employed in various common forms in which it is supplied; for example as a salt or aqueous solution applied to a carrier material such as PVC, Ca silicate, zeolites or hydrotalcites, or obtained by chemical reaction of hydrotalcite with perchloric acid.

The perchlorates can be employed in an amount of, for example, from 0.001 to 5 parts by weight, expediently from 0.01 to 3 parts by weight and, with particular preference, from 0.01 to 2 parts by weight, based on 100 parts by weight of PVC.

Hydrotalcites and zeolites: The chemical composition of these compounds is known to the skilled worker, for example from the patent documents DE 3843581, U.S. Pat. No. 4,000,100, EP 062813, WO 93/20135.

Compounds from the series of the hydrotalcites can be described by the general formula VII $$M^{2+}_{1-x} \cdot M^{3+}_x \cdot (OH)_2 \cdot (A^{n-})_{x/n} \cdot mH_2O \quad (VI)$$

in which $M^{2+}$=one or more metals from the group consisting of Mg, Ca, Sr, Zn and Sn, $M^{3+}$=Al or B, $A^n$ is an anion having the valency n, n is a number from 1–2, $0 < x \leq 0.5$, and m is a number from 0–20.

$A^n$ is preferably=$OH^-$, $ClO_4^-$, $HCO_3^-$, $CH_3COO^-$, $C_6H_5COO^-$, $CO_3^{2-}$, $SO_4^-$,

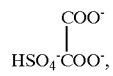

$HSO_4^-COO^-$,

Examples of hydrotatcites are
$Al_2O_3 \cdot 6MgO \cdot CO_2 \cdot 12H_2O$, $Mg_{4.5}Al_2(OH)_{13} \cdot CO_3 \cdot 3.5H_2O$, $4MgO \cdot Al_2O_3 \cdot CO_2 \cdot 9H_2O$, $4MgO \cdot Al_2O_3 \cdot CO_2 \cdot 6H_2O$, $ZnO \cdot 3MgO \cdot Al_2O_3 \cdot CO_2 \cdot 8-9H_2O$ and $ZnO \cdot 3MgO \cdot Al_2O_3 \cdot CO_2 \cdot 5-6H_2O$.

Compounds from the series of the zeolites (alkali metal and/or alkaline earth metal aluminosilicates) can be described by the general formula (VIII)

$$M_{x/n}[(AlO_2)_x (SiO_2)_y] \cdot wH_2O \quad (VIII)$$

in which n is the charge of the cation M;

M is an element from the first or second main group, such as Li, Na, K, Mg, Ca, Sr or Ba, or Zn, y:x is a number from 0.8 to 15, preferably from 0.8 to 1.2; and w is a number from 0 to 300, preferably from 0.5 to 30.

Structures can be found, for example, in the "Atlas of Zeolite" by W. M. Meier and D. H. Olson, Butterworth-Heinemann, 3rd ed. 1992.

Examples of zeolites are sodium alumosilicates of the formulae
$Na_{12}Al_{12}Si_{12}O_{48} \cdot 27\ H_2O$ [zeolite A], $Na_6Al_6Si_6O_{24} \cdot 2\ NaX \cdot 7.5\ H_2O$, X=OH, halogen, $ClO_4$ [sodalite]; $Na_6Al_6Si_{30}O_{72} \cdot 24\ H_2O$; $Na_8Al_8Si_{40}O_{96} \cdot 24\ H_2O$; $Na_{16}Al_{16}Si_{24}O_{80} \cdot 16\ H_2O$; $Na_{16}Al_{16}Si_{32}O_{96} \cdot 16\ H_2O$; $Na_{56}Al_{56}Si_{136}O_{384} \cdot 250\ H_2O$ [zeolite Y], $Na_{86}Al_{86}Si_{106}O_{384} \cdot 264\ H_2O$ [zeolite X];

or the zeolites which can be prepared by partial or complete exchange of the Na atoms by Li, K, Mg, Ca, Sr or Zn atoms, such as
$(Na,K)_{10}Al_{10}Si_{22}O_{64} \cdot 20\ H_2O$; $Ca_{4.5}Na_3[(AlO_2)_{12}(SiO_2)_{12}] \cdot 30\ H_2O$; $K_9Na_3[(AlO_2)_{12}\ (SiO_2)_{12}] \cdot 27\ H_2O$.

Other suitable zeolites are:
$Na_2O \cdot Al_2O_3 \cdot (2\ to\ 5)\ SiO_2 \cdot (3.5\ to\ 10)\ H_2O$ [zeolite P]
$Na_2O \cdot Al_2O_3 \cdot 2\ SiO_2 \cdot (3.5-10)H_2O$ (zeolite MAP)

or the zeolites which can be prepared by partial or complete exchange of the Na atoms by Li, K or H atoms, such as (Li,Na,K,H)$_{10}$ Al$_{10}$Si$_{22}$O$_{64}$·20 H$_2$O, K$_9$Na$_3$ [(AlO$_2$)$_{12}$ (SiO$_2$)$_{12}$]·27 H$_2$O, K$_4$Al$_4$Si$_4$O$_{16}$·6H$_2$O [zeolite K-F], Na$_8$Al$_8$Si$_{40}$O$_{96}$·24 H$_2$O zeolite D, as described in Barrer et al., J. Chem. Soc. 1952, 1561–71, and in U.S. Pat. No. 2,950,952;

Also suitable are the following zeolites:

K offretite, as described in EP-A-400,961; zeolite R, as described in GB 841,812; zeolite LZ-217, as described in U.S. Pat. No. 4,503,023; Ca-free zeolite LZ-218, as described in U.S. Pat. No. 4,333,859; zeolite T, zeolite LZ-220, as described in U.S. Pat. No. 4,503,023; Na$_3$K$_6$Al$_9$Si$_{27}$O$_{72}$·21 H$_2$O [zeolite L]; zeolite LZ-211, as described in U.S. Pat. No. 4,503,023; zeolite LZ-212 as described in U.S. Pat. No. 4,503,023; zeolite O, zeolite LZ-217 as described in U.S. Pat. No. 4,503,023; zeolite LZ-219, as described in U.S. Pat. No. 4,503,023; zeolite rho, zeolite LZ-214, as described in U.S. Pat. No. 4,503,023; zeolite ZK-19, as described in Am. Mineral. 54 1607 (1969); zeolite W (K-M), as described in Barrer et al., J. Chem. Soc. 1956, 2882; and Na$_{30}$Al$_{30}$Si$_{66}$O$_{192}$·98 H$_2$O [zeolite ZK-5, zeolite Q].

Particular preference is given to the use of zeolite P types of the formula VIII in which x is 2 to 5 and y is 3.5 to 10, especially zeolite MAP of the formula VIII in which x is 2 and y is 3.5 to 10. The substance concerned is, in particular, zeolite Na-P, i.e. M is Na. This zeolite occurs generally in the variants Na-P-1, NaP-2 and Na-P-3, which differ in their cubic, tetragonal or orthorhombic structure (R. M. Barrer, B. M. Munday, J.Chem.Soc. A 1971, 2909–14). The literature reference just mentioned also describes the preparation of zeolite P-1 and P-2. Zeolite P-3 is accordingly very rare and therefore of virtually no practical interest. The structure of zeolite P-1 corresponds to the gismondite structure known from the abovementioned Atlas of Zeolite Structures. In more recent literature (EP-A-384 070) a distinction is made between cubic (zeolite B or P$_C$) and tetragonal (zeolite P$_1$) zeolite of the P type. Also mentioned therein are more recent zeolites of the P type with Si:Al ratios below 1.07:1. These are zeolites bearing the designation MAP or MA-P, for Maximum Aluminium P. Depending on the preparation process, zeolite P may include small fractions of other zeolites. Highly pure zeolite P has been described in WO 94/26662.

In the context of the invention it is also possible to use those finely divided, water-insoluble sodium alumosilicates which have been precipitated in the presence of water-soluble inorganic or organic dispersants and crystallized. These can be introduced in the reaction mixture in any desired manner, prior to or during the precipitation or crystallization.

Preference is given to Na-zeolite A and Na-zeolite P.

The hydrotalcites and zeolites can be naturally occurring minerals or synthetically prepared compounds.

The hydrotalcites and/or zeolites can be employed in amounts of, for example from 0.1 to 50 parts by weight, expediently from 0.1 to 10 parts by weight and, in particular, from 0.1 to 5 parts by weight, based on 100 parts by weight of halogen-containing polymer.

Alkali metal alumocarbonates (dawsonites): These compounds can be represented with the formula

{(M$_2$O)$_m$·(Al$_2$O$_3$)$_n$Z$_o$·pH$_2$O}  (V), in which M is H, Li, Na, K, Mg$_{1/2}$, Ca$_{1/2}$, Sr$_{1/2}$ or Zn$_{1/2}$; Z is CO$_2$, SO$_2$, (Cl$_2$O$_7$)$_{1/2}$, B$_4$O$_6$, S$_2$O$_2$ (thiosulfate) or C$_2$O$_2$ (oxalate); m, if M is Mg$_{1/2}$ or Ca$_{1/2}$, is a number between 1 and 2, in all other cases a number between 1 and 3; n is a number between 1 and 4; o is a number between 2 and 4; and p is a number between 0 and 30.

The alumo salt compounds of the formula (V) which can be used can be naturally occurring minerals or synthetically prepared compounds. The metals can be partially substituted by one another. The abovementioned alumo salt compounds are crystalline, partially crystalline or amorphous or can be present in the form of a dried gel. The alumo salt compounds can also be present in rarer, crystalline modifications. A process for preparing such compounds is specified in EP 394670. Examples of naturally occurring alumo salt compounds are indigirite, tunisite, alumohydrocalcite, para-alumohydrocalcite, strontiodresserite and hydro-strontiodresserite. Further examples of alumo salt compounds are potassium alumocarbonate {(K$_2$O)·(Al$_2$O$_3$) ·(CO$_2$)$_2$·2H$_2$O}, sodium alumothiosulfate {(Na$_2$O)·(Al$_2$O$_3$) ·(S$_2$O$_2$)$_2$·2H$_2$O}, potassium alumosulfite {(K$_2$O)·(Al$_2$O$_3$)· (SO$_2$)$_2$·2H$_2$O}, calcium alumooxalate {(CaO)·(Al$_2$O$_3$)· (C$_2$O$_2$)$_2$·5H$_2$O}, magnesium alumotetraborate {(MgO)· (Al$_2$O$_3$)·(B$_4$O$_6$)$_2$·5H$_2$O}, {([Mg$_{0.2}$Na$_{0.6}$]$_2$O)·(Al$_2$O$_3$)·(CO$_2$)$_2$·4.1H$_2$O}, {([Mg$_{0.2}$Na$_{0.6}$]$_2$O)·(Al$_2$O$_3$)·(CO$_2$)$_2$·4.3H$_2$O} and {([Mg$_{0.3}$Na$_{0.4}$]$_2$O)·(Al$_2$O$_3$)·(CO$_2$)$_{2.2}$·4.9H$_2$O}.

The mixed alumo salt compounds can be obtained in accordance with methods known per se by cationic exchange, preferably from the alkali metal alumo salt compounds, or by combined precipitation (see for example U.S. Pat. No. 5,055,284).

Preferred alumo salt compounds are those of the above formula in which M is Na or K; Z is CO$_2$, SO$_2$ or (Cl$_2$O$_7$)$_{1/2}$; m is 1–3; n is 1–4; o is 2–4 and p is 0–20. Z is particularly preferably CO$_2$.

Also preferred are compounds which can be represented by the following formulae:

M$_2$O·Al$_2$O$_3$·(CO$_2$)$_2$·pH$_2$O  (Ia),

(M$_2$O)$_2$·(Al$_2$O$_3$)$_2$·(CO$_2$)$_2$·pH$_2$O  (Ib),

M$_2$O·(Al$_2$O$_3$)$_2$·(CO$_2$)$_2$·pH$_2$O  (Ic)

in which M is a metal such as Na, K, Mg$_{1/2}$, Ca$_{1/2}$, Sr$_{1/2}$ or Zn$_{1/2}$ and p is a number from 0 to 12.

Particular preference is given to sodium alumodihydroxy-carbonate (DASC) and the homologous potassium compound (DAPC).

The dawsonites can be employed in an amount of, for example, from 0.01 to 50 parts by weight, expediently from 0.1 to 10 parts by weight, particularly preferably from 0.1 to 5 parts by weight, based on 100 parts by weight of halogen-containing polymer.

The novel stabilizer combination can be used together with further additives which are customary for the processing and stabilizing of chlorine-containing polymers, examples being:

antioxidants: Suitable examples are:

1. Alkylated monophenols, for example 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-dinonyl-4-methylphenol, 2,4-dimethyl-6-(1'-methylundec-1'-yl)-phenol, 2,4-dimethyl-6-(1'-methylheptadec-1'-yl)phenol, 2,4-dimethyl-6-(1'-methyl tridec-1'-yl)phenol and mixtures thereof.

2. Alkylthiomethylphenols, for example 2,4-dioctylthiomethyl-6-tert-butylphenol, 2,4- dioctylthiomethyl-6-methylphenol, 2,4-dioctylthiomethyl-6-ethylphenol, 2,6-didodecyl-thiomethyl-4-nonylphenol.

3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

4. Tocopherols, for example α-tocopherol, β-tocopherol, γ-tocopherol, δ-tocopherol and mixtures thereof (vitamin E).

5. Hydroxylated thiodiphenyl ethers, for example 2,2'-thiobis(6-tert-butyl-4-methyl-phenol), 2,2'-thiobis(4-octylphenol), 4,4'-thiobis(6-tert-butyl-3-methylphenol), 4,4'-thiobis-(6-tert-butyl-2-methylphenol), 4,4'-thiobis(3,6-di-sec-amylphenol), 4,4'-bis(2,6-dimethyl-4-hydroxyphenyl) disulfide.

6. Alkylidenebisphenols, for example 2,2'-methylenebis (6-tert-butyl-4-methylphenol), 2,2'-methylenebis(6-tert-butyl4-ethylphenol), 2,2'-methylenebis[4-methyl-6-(α-methyl-cyclohexyl)phenol], 2,2'-methylenebis(4-methyl-6-cyclohexylphenol), 2,2'-methylenebis-(6-nonyl-4-methylphenol), 2,2'-methylenebis(4,6-di-tert-butylphenol), 2,2'-ethylidenebis-(4,6-di-tert-butylphenol), 2,2'-ethylidenebis(6-tert-butyl-4-isobutylphenol), 2,2'-methylene-bis[6-(α-methylbenzyl)-4-nonylphenol], 2,2'-methylenebis[6-(α,α-dimethylbenzyl)-4-nonyl-phenol], 4,4'-methylenebis(2,6-di-tert-butylphenol), 4,4'-methylenebis(6-tert-butyl-2-methyl-phenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis (5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl] terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

7. O-, N- and S-benzyl compounds, for example 3,5,3', 5'-tetra-tert-butyl-4,4'-di-hydroxydibenzyl ether, octadecyl 4-hydroxy-3,5-dimethylbenzylmercaptoacetate, tris(3,5-di-tert-butyl-4-hydroxybenzyl)amine, bis(4-tert-butyl-3-hydroxy-2,6-dimethylbenzyl)dithio-terephthalate, bis(3,5-di-tert-butyl-4-hydroxybenzyl) sulfide, isooctyl 3,5-di-tert-butyl-4-hydroxybenzylmercaptoacetate.

8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl) malonate, didodecyl mercaptoethyl-2,2-bis(3,5-di-tert-butyl-4-hydroxybenzyl)malonate, di-[4-(1,1,3,3-tetramethylbutyl)phenyl] 2,2-bis(3,5-di-tert-butyl-4-hydroxybenzyl)malonate.

9. Aromatic hydroxybenzyl compounds, for example 1,3, 5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

10. Triazine compounds, for example 2,4-bisoctylmercapto-6-(3,5-di-tert-butyl-4-hydroxyanilino)-1, 3,5-triazine, 2-octylmercapto-4,6-bis(3,5-di-tert-butyl-4-hydroxyanilino)-1,3,5-triazine, 2-octylmercapto-4,6-bis(3, 5-di-tert-butyl-4-hydroxyphenoxy)-1,3,5-triazine, 2,4,6-tris (3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

11. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, the calcium salt of the monoethyl ester of 3,5-di-tert-butyl-4-hydroxybenzylphosphonic acid.

12. Acylaminophenols, for example 4-hydroxylauranilide, 4-hydroxystearanilide, octyl N-(3,5-di-tert-butyl-4-hydroxyphenyl)carbamate.

13. Esters of β(3,5-di-tert-butyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2,2,2]octane.

14. Esters of β(5-tert-butyl-4-hydroxy-3-methylphenyl) propionic acid with mono- or polyhydric alcohols, e.g. with methanol, ethanol, octanol, octadecanol, 1,6-hexanediol, 1,9-nonane-diol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxy-ethyl)oxalamide, 3-thiaundecanol, 3-thiapentadecanol, trimethylhexanediol, trimethylol-propane, 4-hydroxymethyl-1-phospha-2,6,7-trioxabicyclo[2.2.2]octane.

15. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis-(hydroxyethyl)oxalamide, 3-thiaundecanol, 3-thiapentadecanol, trimethylhexanediol, trimethylolpropane, 4-hydroxymethyl-1-phospha-2,6,7-trioxabicyclo[2.2.2]octane.

17. Amides of β-(3,5-di-tert-butyl-4-hydroxyphenyl) propionic acid, for example N,N'-bis(3,5-di-tert-butyl-4-hydroxyphenylpropionyl)hexamethylenediamine, N,N'-bis (3,5-di-tert-butyl-4-hydroxyphenylpropionyl) trimethylenediamine, N,N'-bis(3,5-di-tert-butyl-4-hydroxyphenyl-propionyl)hydrazine.

If desired it is also possible to employ a mixture of antioxidants differing in structure.

The antioxidants can be employed in an amount of, for example, from 0.01 to 10 parts by weight, expediently from 0.05 to 10 parts by weight and, in particular, from 0.05 to 5 parts by weight, based on 100 parts by weight of PVC.

UV absorbers and light stabilizers: examples of these are:

1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)benzotriazole, 2-(2'-hydroxy-4'-octoxyphenyl)benzotriazole, 2-(3',5'-di-tert-amyl-2'-hydroxyphenyl)benzotriazole, 2-(3',5'-bis(α,α-dimethylbenzyl)-2'-hydroxyphenyl)benzotriazole, a mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxyphenyl)benzotriazole, 2-(3'-dodecyl-2'-hydroxy-5'-methylphenyl)benzotriazole, and 2-(3'-tert-butyl-2'-hydroxy-5'-(2-isooctyloxycarbonylethyl)phenylbenzotriazole, 2,2'-methylenebis[4-(1,1,3,3-tetramethylbutyl)-6-benzotriazol-2-ylphenol]; the transesterification product of 2-[3'-tert-butyl-5'-(2-methoxycarbonylethyl)-2'-hydroxyphenyl]benzotriazole with polyethylene glycol 300;

where R=3'-tert-butyl-4'-hydroxy-5'-2H-benzotriazol-2-ylphenyl.

2. 2-Hydroxybenzothenones, for example the 4-hydroxy, 4-methoxy, 4-octoxy, 4-decyloxy, 4-dodecyloxy, 4-benzyloxy, 4,2',4'-trihydroxy and 2'-hydroxy-4,4'-dimethoxy derivative.

3. Esters of substituted or unsubstituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

4. Acrylates, for example ethyl α-cyano-β,β-diphenylacrylate or isooctyl α-cyano-β,β-diphenylacrylate, methyl α-carbomethoxycinnamate, methyl α-cyano-β-methyl-p-methoxycinnamate or butyl α-cyano-β-methyl-p-methoxycinnamate, methyl α-carbomethoxy-p-methoxycinnamate and N-(β-carbomethoxy-β-cyanovinyl)-2-methylindoline.

5. Nickel compounds, for example nickel complexes of 2,2'-thio-bis-[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of monoalkyl esters, such as of the methyl or ethyl ester, of 4-hydroxy-3,5-di-tert-butylbenzylphosphonic acid, nickel complexes of ketoximes, such as of 2-hydroxy4-methylphenyl undecyl ketoxime, nickel complexes of 1-phenyl-4-lauroyl-5-hydroxypyrazole, with or without additional ligands.

6. Sterically hindered amines, for example bis(2,2,6,6-tetramethylpiperidyl) sebacate, bis(2,2,6,6-tetramethylpiperidyl) succinate, bis(1,2,2,6,6-pentamethylpiperidyl) sebacate, bis(1,2,2,6,6-pentamethylpiperidyl) n-butyl 3,5-di-tert-butyl-4-hydroxybenzylmalonate, the condensate of 1-hydroxyethyl-2,2,6,6-tetramethyl-4-hydroxypiperidine and succinic acid, the condensate of N,N'-bis(2,2,6,6-tetramethyl-4-piperidyl) hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)bis( 3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decan-2,4-dione, bis(1-octyloxy-2,2,6,6-tetramethylpiperidyl) sebacate, bis(1-octyloxy-2,2,6,6-tetramethylpiperidyl) succinate, the condensate of N,N'-bis(2,2,6,6-tetramethyl-4-piperidyl)hexamethylenediamine and 4-morpholino-2,6-dichloro-1,3,5-triazine, the condensate of 2-chloro-4,6-di(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis-(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione.

7. Oxalamides, for example 4,4'-dioctyloxyoxanilide, 2,2'-diethoxyoxanilide, 2,2'-dioctyloxy-5,5'-di-tert-butyloxanilide, 2,2'-didodecyloxy-5,5'-di-tert-butyloxanilide, 2-ethoxy-2'-ethyloxanilide, N,N'-bis(3-dimethylaminopropyl)oxalamide, 2-ethoxy-5-tert-butyl-2'-ethyloxanilide and its mixture with 2-ethoxy-2'-ethyl-5,4'-di-tert-butyloxanilide and mixtures of o- and p-methoxy and of o- and p-ethoxy-disubstituted oxanilides.

8. 2-(2-Hydroxyphenyl)-1,3,5-triazines, for example 2,4,6-tris(2-hydroxy-4-octyloxy-phenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis-(2-hydroxy-4-propyloxyphenyl)-6-(2,4-dimethylphenyl)-1,3,5-triazine, 2-(2-hydroxy-4-octyl-oxyphenyl)-4,6-bis(4-methylphenyl)-1,3,5-triazine, 2-(2-hydroxy-4-dodecyloxyphenyl)-4,6-bis-(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropoxy)-phenyl]-4,6-bis(2,4-dimethylphenyl)-1,3,5-triazine.

The novel stabilizer mixture is preferred with alkali metal or alkaline earth metal carboxylates, especially calcium carboxylates, with aluminium carboxylates, with 1,3-dicarbonyl compounds, with dihydropyridines, with phosphites or with combinations of these substances.

Plasticizers: Examples of suitable organic plasticizers are those from the following groups A) Phthalic esters Examples of such plasticizers are dimethyl, diethyl, dibutyl, dihexyl, di-2-ethylhexyl, di-n-octyl, di-isooctyl, di-isononyl, di-isodecyl, di-isotridecyl, dicyclohexyl, di-methylcyclohexyl, dimethylglycol, dibutylglycol, benzyl butyl and diphenyl phthalate, and also mixtures of phthalates, such as $C_{7-9}$- and $C_{9-11}$alkyl phthalates from predominantly linear alcohols, $C_{6-10}$-n-alkyl phthalates and $C_{8-10}$-n-alkyl phthalates. Among these, preference is given to dibutyl, dihexyl, di-2-ethylhexyl, di-n-octyl, di-isooctyl, di-isononyl, di-isodecyl, di-isotridecyl and benzyl butyl phthalate and to the abovementioned mixtures of alkyl phthalates. Particular preference is given to di-2-ethylhexyl, di-isononyl and di-isodecyl phthalate, which are also known under the common abbreviations DOP (dioctyl phthalate, di-2-ethylhexyl phthalate), DINP (diisononyl phthalate), and DIDP (diisodecyl phthalate).

B) Esters of aliphatic dicarboxylic acids, especially esters of adipic, azeleic and sebacic acid Examples of such plasticizers are di-2-ethylhexyl adipate, di-isooctyl adipate (mixture), di-isononyl adipate (mixture), di-isodecyl adipate (mixture), benzyl butyl adipate, benzyl octyl adipate, di-2-ethylhexyl azelate, di-2-ethylhexyl sebacate and di-isodecyl sebacate (mixture). Preference is given to di-2-ethylhexyl adipate and di-isooctyl adipate.

C) Trimellitic esters, for example tri-2-ethylhexyl trimellitate, tri-isodecyl trimellitate (mixture), tri-isotridecyl trimellitate, tri-isooctyl trimellitate (mixture) and also tri-$C_{6-8}$alkyl, tri-$C_{6-10}$alkyl, tri-$C_{7-9}$alkyl and tri-$C_{9-11}$alkyl trimellitates. The latter trimellitates are formed by esterification of trimellitic acid with the corresponding mixtures of alcanols. Preferred trimellitates are tri-2-ethylhexyl trimellitate and the abovementioned trimellitates from alcanol mixtures. Common abbreviations are TOTM (trioctyl trimellitate, tri-2-ethylhexyl trimellitate), TIDTM (triisodecyl trimellitate) and TITDTM (triisotridecyl trimellitate).

D) Epoxy plasticizers

These are principally epoxidized unsaturated fatty acids such as epoxidized soybean oil.

E) Polymer plasticizers

The most common starting materials for the preparation of the polyester plasticizers are: dicarboxylic acids such as adipic, phthalic, azeleic and sebacic acid; and diols such as 1,2-propanediol, 1,3-butanediol, 1,4-butanediol, 1,6-hexanediol, neopentylglycol and diethylene glycol.

F) Phosphoric esters

Examples of such phosphoric esters are tributyl phosphate, tri-2-ethylbutyl phosphate, tri-2-ethylhexyl phosphate, trichloroethyl phosphate, 2-ethylhexyl diphenyl phosphate, cresyl diphenyl phosphate, triphenyl phosphate, tricresyl phosphate and trixylenyl phosphate. Preference is given to tri-2-ethylhexyl phosphate and to ®Reofos 50 and 95 (from FMC).

G) Chlorinated hydrocarbons (paraffin)

H) Hydrocarbons

I) Monoesters, for example butyl oleate, phenoxyethyl oleate, tetrahydrofurfuryl oleate and alkylsulfonic esters.

J) Glycol esters, for example diglycol benzoates.

Definitions and examples of plasticizers from groups A) to J) can be found in the following handbooks:

"Taschenbuch der Kunststoffadditive", eds. R. Gächter and H. Müller, Carl Hanser Verlag, 1989, Chapter 5, pp. 341–442.

"PVC Technology", ed. W. V. Titow, 4th. Ed., Elsevier Publishers, 1984, Chapter 6, pages 147–180.

It is also possible to employ mixtures of different plasticizers.

The plasticizers can be employed in an amount of, for example, from 5 to 120 parts by weight, expediently from 10 to 100 parts by weight, based on 100 parts by weight of PVC.

Examples of suitable lubricants are: montan wax, fatty acid esters, PE waxes, amide waxes, chlorinated paraffins, glycerol esters or alkaline earth metals soaps, and silicone-based lubricants as described in EP 225261. Lubricants which can be used are also described in "Taschenbuch der Kunststoffadditive", eds. R. Gächter and H. Müller, Carl Hanser Verlag, 3rd edition, 1989, pages 478–488.

Fillers: Examples of possible fillers ("Handbook of PVC-Formulating" by E. J. Wickson, John Wiley & Sons, New York 1993, pp. 393–449) and reinforcing agents ("Taschenbuch der Kunststoffadditive", eds. R. Gächter and H. Müller, Carl Hanser Verlag, 3rd edition, 1989, pages 549–615) are: calcium carbonate, dolomite, wollastonite, magnesium oxide, magnesium hydroxide, silicates, glass fibres, talc, kaolin, chalk, mica, metal oxides and metal hydroxides, carbon black or graphite), preference being given to chalk.

Pigments: Suitable substances are known to the skilled worker. Examples of inorganic pigments are $TiO_2$, carbon black, $Fe_2O_3$, $Sb_2O_3$, $(Ti,Ba,Sb)O_2$, $Cr_2O_3$, spinels such as cobalt blue and cobalt green, $Cd(S,Se)$, ultramarine blue. Preference is given to $TiO_2$, including its micronized form. Examples of organic pigments are azo pigments, phthalocyanine pigments, quinacridone pigments, perylene pigments, pyrrolopyrrole pigments and anthraquinone pigments. Further details are to be found in "Handbook of PVC Formulating", E. J. Wickson, John Wiley & Sons, New York 1993, pp. 449–474.

Blowing agents: Blowing agents are organic azo and hydrazo compounds, tetrazoles, oxazines, isatoic anhydride, and also soda and sodium bicarbonate. Preference is given to azodicarboxamide and sodium bicarbonate and mixtures thereof.

Definitions and examples of the auxiliaries and additives not listed in more detail can be found in the handbooks mentioned in the text.

Examples of the chlorine-containing polymers to be stabilized or their recyclates are: polymers of vinyl chloride, vinyl resins containing vinyl chloride units in their structure, such as copolymers of vinyl chloride and vinyl esters of aliphatic acids, especially vinyl acetate, copolymers of vinyl chloride with esters of acrylic and methyacrylic acid and with acrylonitrile, copolymers of vinyl chloride with diene compounds and unsaturated dicarboxylic acids or their anhydrides, such as copolymers of vinyl chloride with diethyl maleate, diethyl fumarate or maleic anhydride, post-chlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerizable compounds; polymers of vinyl chloroacetate and dichlorodivinyl ether; chlorinated polymers of vinyl acetate, chlorinated polymeric esters of acrylic acid and of α-substituted acrylic acid; polymers of chlorinated styrenes, for example dichlorostyrene; chlorinated rubbers; chlorinated polymers of ethylene; polymers and post-chlorinated polymers of chlorobutadiene and copolymers thereof with vinyl chloride, rubber-hydrochloride and chlorinated rubber hydrochloride; and mixtures of the abovementioned polymers with each other or with other polymerizable compounds.

Also included are the graft polymers of PVC with EVA, ABS and MBS. Other preferred substrates are mixtures of the abovementioned homo- and copolymers, especially, vinyl chloride homopolymers, with other thermoplastic and/or elastomeric polymers, especially blends with ABS, MBS, NBR, SAN, EVA, CPE, MBAS, PMA, PMMA, EPDM and polylactones.

Preference extends to suspension polymers and bulk polymers, and to emulsion polymers.

A particularly preferred chlorine-containing polymer is polyvinyl chloride, especially suspension polymer and bulk polymer.

In the context of this invention the term PVC also includes copolymers or graft polymers of PVC with polymerizable compounds such as acrylonitrile, vinyl acetate or ABS, which can be suspension, bulk or emulsion polymers. Preference is given to PVC homopolymer, alone or in combination with polyacrylates.

For stabilization in the context of this invention, further suitable polymers are, in particular, recyclates of chlorine-containing polymers, these polymers being the polymers described in more detail above that have undergone damage through processing, use or storage. PVC recyclate is particularly preferred. The recyclates may also include small amounts of extraneous substances, for example paper, pigments, adhesives, which are often difficult to remove. These extraneous substances may also arise from contact with various materials in the course of use or of reprocessing, examples being residues of fuel, fractions of coating material, traces of metal and residues of initiator.

The invention also relates to a method of stabilizing chlorine-containing polymers, which comprises adding to these polymers a stabilizer combination according to claim 1 and intimately mixing the components in appropriate apparatus.

The stabilizers can expediently be incorporated by the following methods:

- as an emulsion or dispersion (one possibility, for example, is the form of a pastelike mixture. An advantage of the novel combination in the case of this form is the stability of the paste.);
- as a dry mixture in the course of the mixing of additional components or polymer mixtures;
- by direct addition to the processing apparatus (e.g. calanders, mixers, compounders, extruders and the like) or
- as a solution or melt.

The PVC stabilized in accordance with the invention, which is likewise provided by the invention, can be prepared in a manner known per se by mixing the novel stabilizer combination, with or without further additives, with the PVC using devices known per se such as the abovementioned processing apparatus. In this case, the stabilizers can be added individually or as a mixture or else in the form of so-called masterbatches.

The invention consequently also provides a process for preparing stabilized PVC, which comprises mixing the above-described components (b), (c) and (d), with or without further additives, with the PVC using devices such as calenders, mixers, compounders, extruders and the like.

The PVC stabilized in accordance with the present invention can be brought into the desired form by known methods. Examples of such methods are milling, calendering, extruding, injection moulding, sintering or spinning, and also extrusion blowmoulding or processing by the plastisol technique. The stabilized PVC can also be processed into foam materials. If azodicarboxamide is employed as blowing agent, it is advantageous if no 1,3-diketones are used in addition.

The PVC stabilized in accordance with the invention is suitable, for example, for semirigid and flexible formulations, especially in the form of flexible formulations for wire sheathing, crash pad sheets (automobiles), cable insulation, which is particularly preferred.

In the form of semirigid formulations, the novel PVC is particularly suitable for decorative films, foams, agricultural films, hoses, sealing profiles and office films.

In the form of rigid formulations, the PVC stabilized in accordance with the invention is particularly suitable for hollow articles (bottles), packaging films (thermoform sheets), blown films, pipes, foam materials, heavy profiles (window frames), transparent-wall profiles, construction profiles, sidings, fittings, office films and apparatus enclosures (computers, domestic appliances).

Examples of the use of the novel PVC as plastisol are artificial leather, floor coverings, textile coatings, wallpapers, coil coatings and underbody protection for motor vehicles.

Examples of sintered PVC applications of the PVC stabilized in accordance with the invention are slush, slush mould and coil coatings.

Preference is given to PVC rigid foams and PVC pipes for drinking water or wastewater, pressure pipes, gas pipes, cable-duct pipes and cable protection pipes, pipes for industrial pipelines, seepage pipes, flowoff pipes, guttering pipes and drainage pipes. For further details on this subject see "Kunststoffhandbuch PVC" vol. 2/2, W. Becker, H. Braun, 2nd ed. 1985, Carl Hanser Verlag, pp. 1235–1277.

The Examples which follow illustrate the invention in more detail but without limiting it. Parts and percentages, as in the remainder of the description, are by weight unless stated otherwise.

EXAMPLE 1

Static heat test

To prepare the stabilizers I to III, zinc stearate is subjected to intense mixing on a tumble mixer with a commercial 1,3-diketone and, in addition, with various proportions of basic aluminium stearate for a period of 1.5 hours.

| STABILIZER | I | II | III |
|---|---|---|---|
| Zinc stearate | 0.8 | 0.4 | 0.2 |
| 1,3-Diketone | 0.2 | 0.2 | 0.2 |
| Basic Al stearate | — | 0.4 | 0.6 |

Of these stabilizer mixtures, 1.0 part portions are mixed with 100 parts of S-PVC (K value 70) and 21 parts of a mixture of dioctyl phthalate and epoxidized soya oil and with a commercial liquid aryl-alkyl phosphite and the mixtures are plasticated on mixing rolls at 190° C. for 5 minutes. Test strips are cut from the resulting sheets (thickness 0.2 mm) and are subjected to thermal stress in a Mathis Thermotakter at 180° C. for the period indicated in the tables below. Subsequently, the Yellowness Index (YI) is determined in accordance with ASTM-1925-70.

The lower the YI value found, the more effective the prevention by the stabilizer system of the yellowing and therefore the damage to the material. The long-term thermal stability of the stabilized polymer is also evident from the sudden occurrence of massive discolouration. A stabilizer is all the more effective the longer this discolouration under thermal stress is delayed, or the lower the initial discolouration and the better the colour retention (low mean discolouration).

TABLE 2

Static heat test at 180° C.

| Stabilizer | Test period (minutes) | | | | | | Interrupted at time [min] |
|---|---|---|---|---|---|---|---|
| | 0 | 6 | 12 | 18 | 24 | 30 | |
| I | 5.1 | 5.6 | | black | | | 11 |
| II | 5.2 | 6.0 | 6.2 | 6.4 | 10.8 | " | 26 |
| III | 8.0 | 8.6 | 9.7 | 11.6 | 13.3 | 15.4 | 67 |

To prepare the stabilizer mixtures IV to IX, a zinc stearate is mixed thoroughly in a tumble mixer with a commercial 1,3-diketone and, in addition, with basic aluminium stearate and an amine compound in accordance with component C over a period of 1.5 hours.

| STABILIZER | IV | V | VI | VII | VIII | IX |
|---|---|---|---|---|---|---|
| Zinc stearate | 0.6 | 0.6 | 0.6 | 0.4 | 0.4 | 0.4 |
| 1,3-Diketone | 0.2 | 0.2 | 0.2 | 0.2 | 0.2 | 0.2 |
| Basic Al stearate | — | 0.2 | 0.2 | — | 0.27 | 0.14 |
| Amine[1)] | — | — | 0.15 | 0.15 | 0.15 | 0.15 |
| Ca stearate | — | — | — | 0.4 | — | 0.2 |

[1)]sterically hindered amine (compound 87, see above)

[1)] sterically hindered amine (compound 87, see above)

Of these stabilizer mixtures, portions each of from 0.8 to 1.1 parts are mixed with 100 parts of S-PVC (K value 70) and 21 parts of a mixture of dioctyl phthalate, epoxidized soybean oil and a commercial liquid aryl-alkyl phosphite, and the mixture is plasticated on mixing rolls at 190° C. for 5 minutes. Test specimens are cut from the resulting sheet and are subjected to thermal stress of 180° C. in a Mathis Thermotakter.

Subsequently, the Yellowness Index is measured in accordance with ASTM 1925-70.

TABLE 3

| Stabilizer | Test period (minutes) | | | | | | Interrupted at time (minutes) |
|---|---|---|---|---|---|---|---|
| | 0 | 6 | 12 | 18 | 24 | 30 | |
| IV | 5.2 | 5.4 | 6.1 | | black | | 13 |
| V | 5.6 | 6.2 | 6.0 | 13.5 | " | " | 18 |
| VI | 6.8 | 6.9 | 7.7 | 8.1 | 8.2 | 9.2 | 55 |
| VII | 6.5 | 7.3 | 7.8 | 8.9 | 9.5 | 11.0 | >78 |
| VIII | 7.1 | 8.5 | 9.1 | 9.5 | 10.4 | 11.3 | >78 |
| IX | 5.9 | 6.2 | 6.1 | 6.3 | 6.6 | 6.9 | >78 |

What is claimed is:

1. A stabilizer combination comprising

A) a zinc compound of the formula I $$Zn(R^1R^2) \qquad (I)$$

and

B) a metal compound of the formula II $$Me^{n+}(R^3{}_a R^4{}_b R^5{}_c) \qquad (II)$$

in which Me is Al, Na or K, a, b and c are 0, 1, 2 or 3, n=a+b+c and can be from 1 to 3, $R^1$ to $R^5$ independently of one another are $C_1$–$C_{22}$carboxylate, $C_2$–$C_{21}$alkenyl-$CO_2$—, phenyl-$CO_2$—, naphthyl-$CO_2$—, $C_5$–$C_{12}$cycloalkyl-$CO_2$—, $C_7$–$C_{18}$alkylphenyl-$CO_2$—, $C_7$–$C_{18}$alkylphenyl-O—, $C_7$–$C_9$phenylalkyl-$CO_2$—, $C_1$–$C_{21}$alkyl-O—, $R^8$—O—CO—$[CH_2]_p$—S— or a radical of the formula $R^6$—CO—CH=$CR^7$—$O^\ominus$— and can be Cl— or HO—, where the abovementioned alkyl or alkenyl radical can be branched, interrupted one or more times by oxygen or substituted by one or more OH groups, and the abovementioned phenyl radical can be substituted by one or more methyl, ethyl, propyl, butyl and/or OH groups, and at least one of $R^1$ to $R^5$ is a radical from the group consisting of $C_1$–$C_{22}$carboxylate, $C_2$–$C_{21}$alkenyl-$CO_2$—, phenyl-$CO_2$—, naphthyl-$CO_2$—, $C_5$–$C_{12}$cycloalkyl-$CO_2$—, $C_7$–$C_{18}$alkylphenyl-$CO_2$—, $C_7$–$C_{18}$alkylphenyl-O—, $C_7$–$C_9$phenylalkyl-$CO_2$—, $C_1$–$C_{21}$alkyl-O—, $R^8$—O—CO—$[CH_2]_p$—S— and the radical of the formula $R^6$—CO—CH=$CR^7$—$O^\ominus$—;

$R^6$ and $R^7$ are $C_1$–$C_8$alkyl-, $C_1$–$C_8$alkenyl-, $C_5$–$C_8$cycloalkyl-, benzyl- or phenyl-, p is 1 to 6, $R^8$ is $C_4$–$C_{22}$alkyl that is uninterrupted or interrupted oxygen, and C) a sterically hindered amine comprising the group

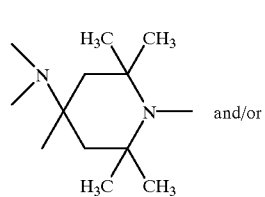

and/or

in which A and Y independently of one another are $C_{1-8}$alkyl-, $C_{3-8}$alkenyl-, $C_{5-8}$cycloalkyl-, or $C_{7-9}$phenylalkyl- or together are $C_{2-5}$alkylene that is uninterrupted or interrupted by O, NH or $CH_3$—N.

2. A stabilizer combination according to claim 1, comprising a compound of the formula I having a Zn—O bond and a compound of the formula II in which at least one radical $R_1$ to $R_5$ is $C_1$–$C_{22}$carboxylate or acetylacetonate and the other radicals are $C_1$–$C_{22}$carboxylate, acetylacetonate or HO—.

3. A stabilizer combination according to claim 1, in which component C is a compound of the formula

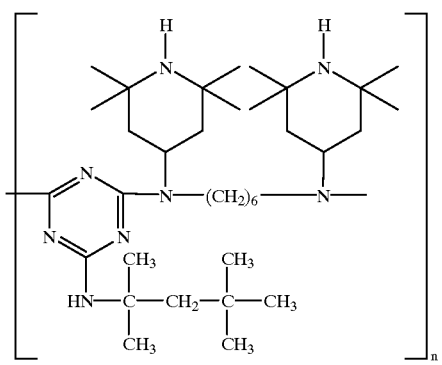

4. A stabilizer combination according to claim 1, additionally comprising a calcium carboxylate.

5. A stabilizer combination according to claim 1, additionally comprising a phosphite.

6. A stabilizer combination according to claim 1, additionally comprising a epoxidized fatty acid ester.

7. A stabilizer combination according to claim 1, additionally comprising a polyol.

8. A stabilizer combination according to claim 1, additionally comprising a compound from the group consisting of the perchlorate compounds, glycidyl compounds, 1,3-diketones and 1,3-diketoesters, dihydropyridines and polydihydropyridines, disaccharide alcohols, zeolites, hydrotalcites, and alkali metal alumocarbonates (dawsonites).

9. A stabilizer combination according to claim 1, additionally comprising a component selected from the group consisting of antioxidants, light stabilizers, UV absorbers, plasticizers, fillers, pigments and lubricants.

10. A composition comprising an organic material and a stabilizer combination according to claim 1.

11. A composition according to claim 10, in which the organic material is a chlorine-containing polymer.

12. A composition according to claim 11, in which the chlorine-containing polymer is PVC.

13. A stabilizer combination according to claim 1, wherein said sterically hindered amine is selected from the groups consisting of N,N'-bis(2,2,6,6-tetramethylpiperidin-4-yl)ethylene-1,2-diacetamide, N,N'-bis(2,2,6,6-tetramethylpiperidin-4-yl)ethylene-1,2-di-formamide, N,N'-bis(2,2,6,6-tetramethylpiperidin-4-yl)adipamide,

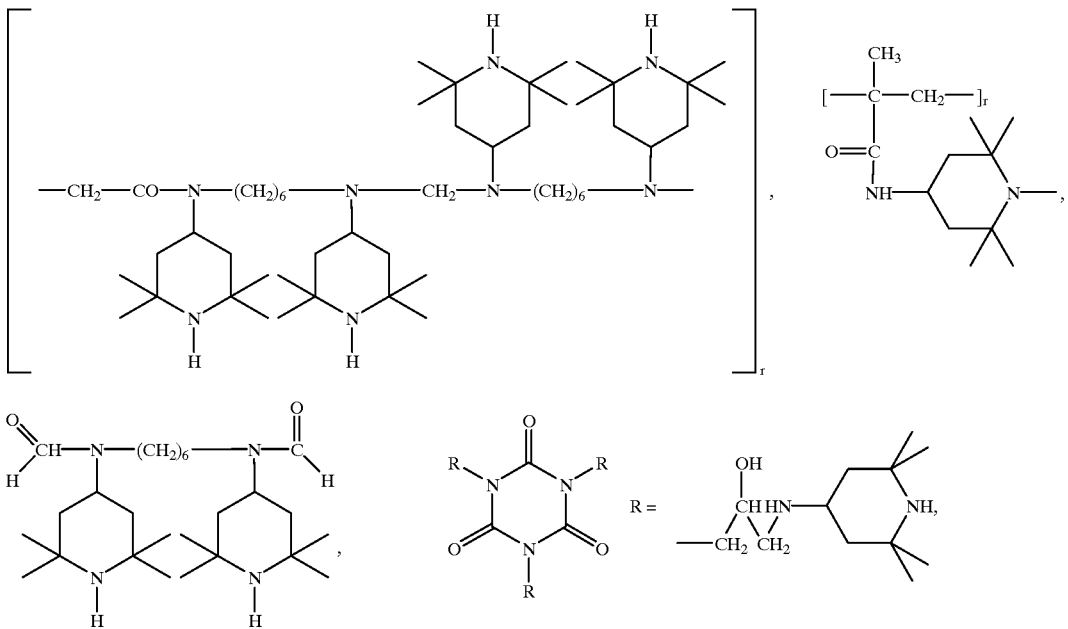

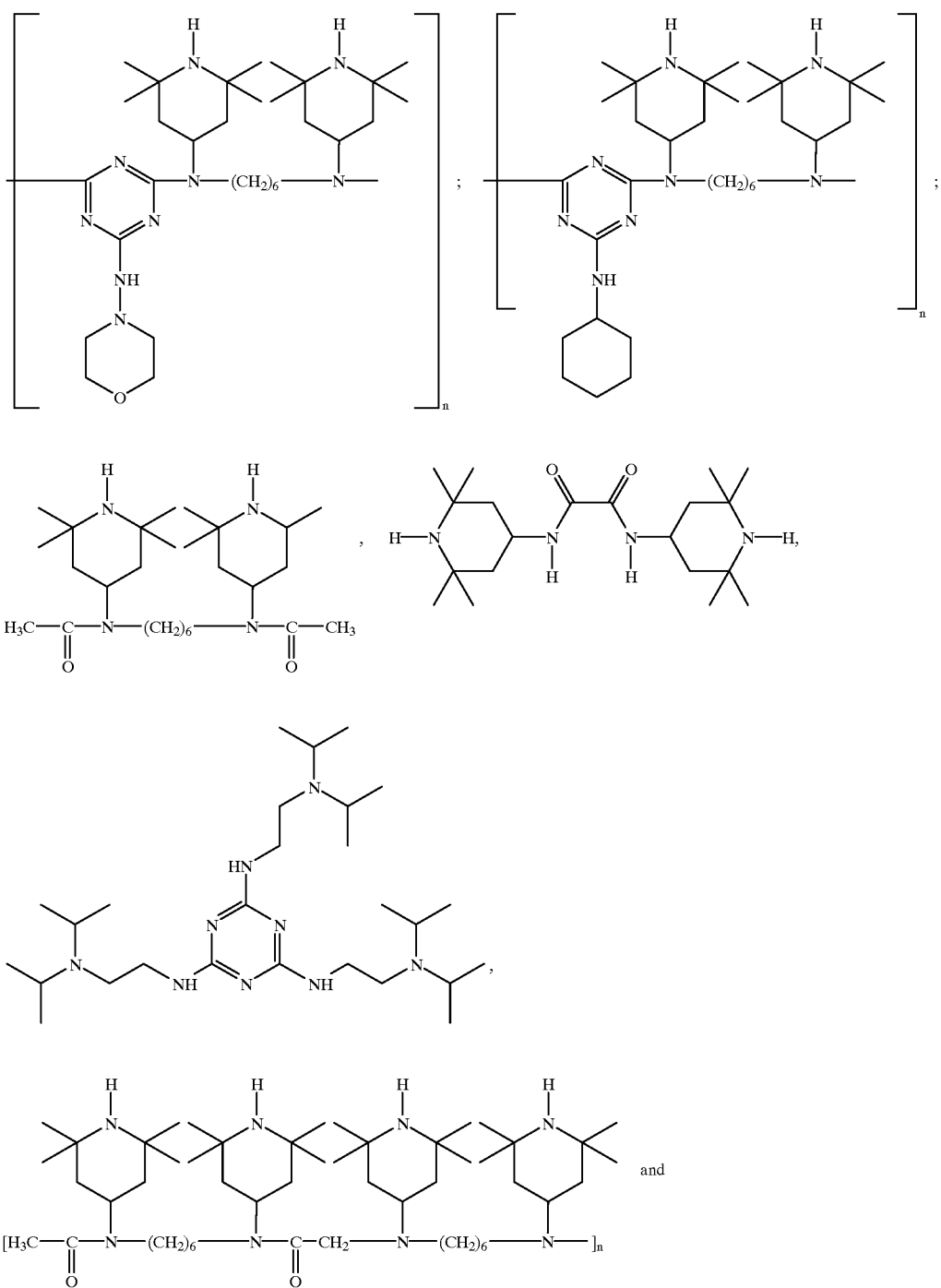

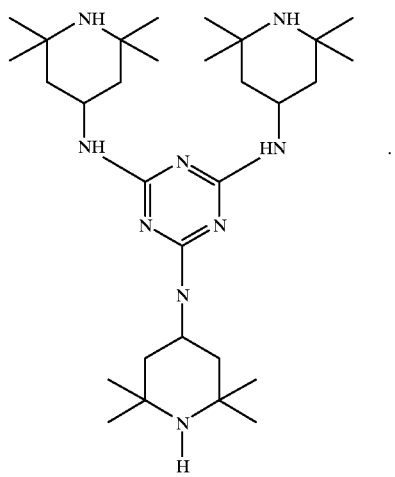
14. A stabilizer combination according to claim 1 wherein Me is aluminum.
* * * * *

UNITED STATES PATENT AND TRADEMARK OFFICE
CERTIFICATE OF CORRECTION

| | | |
|---|---|---|
| PATENT NO. | : 6,013,703 | Page 1 of 1 |
| DATED | : January 11, 2000 | |
| INVENTOR(S) | : K. Kuhn et al. | |

It is certified that error appears in the above-identified patent and that said Letters Patent is hereby corrected as shown below:

Title page,
Item [56], References Cited, U.S. PATENT DOCUMENTS, "40,000,000" should read -- 4,000,100 --

Column 9,
Line 2, "$(CH_2)_6$" should read -- $(CH_2)_3$ --

Column 15,
Line 2, "$(CH_2)_3$" should read -- $(CH_2)_6$ --

Column 30,
114), "H-N" should read -- -N --
116), delete -- NH --

Column 31,
127), N-$_S$-Bu" should read -- N-$C_3H_6$ --
135), $C_3H_6$-N" should read -- $C_3H_6$-$)_2$N --
137), $C_3H_6$-N" should read -- $C_3H_6)_2$N --

Column 41,
Line 21, "butyl4" should read -- butyl-4 --

Column 49,
Table 2, line 26, delete second instance of "1) sterically hindered amine (compound 87, see above)"

Columns 51-52,
"-$CH_2$-N-$(CH_2)_6$-" should read -- -CO-$CH_2$-N-$(CH_2)_2$- --

Signed and Sealed this

Seventeenth Day of June, 2003

JAMES E. ROGAN
*Director of the United States Patent and Trademark Office*